INVENTOR.
HERMAN GANG
BY
ATTORNEY

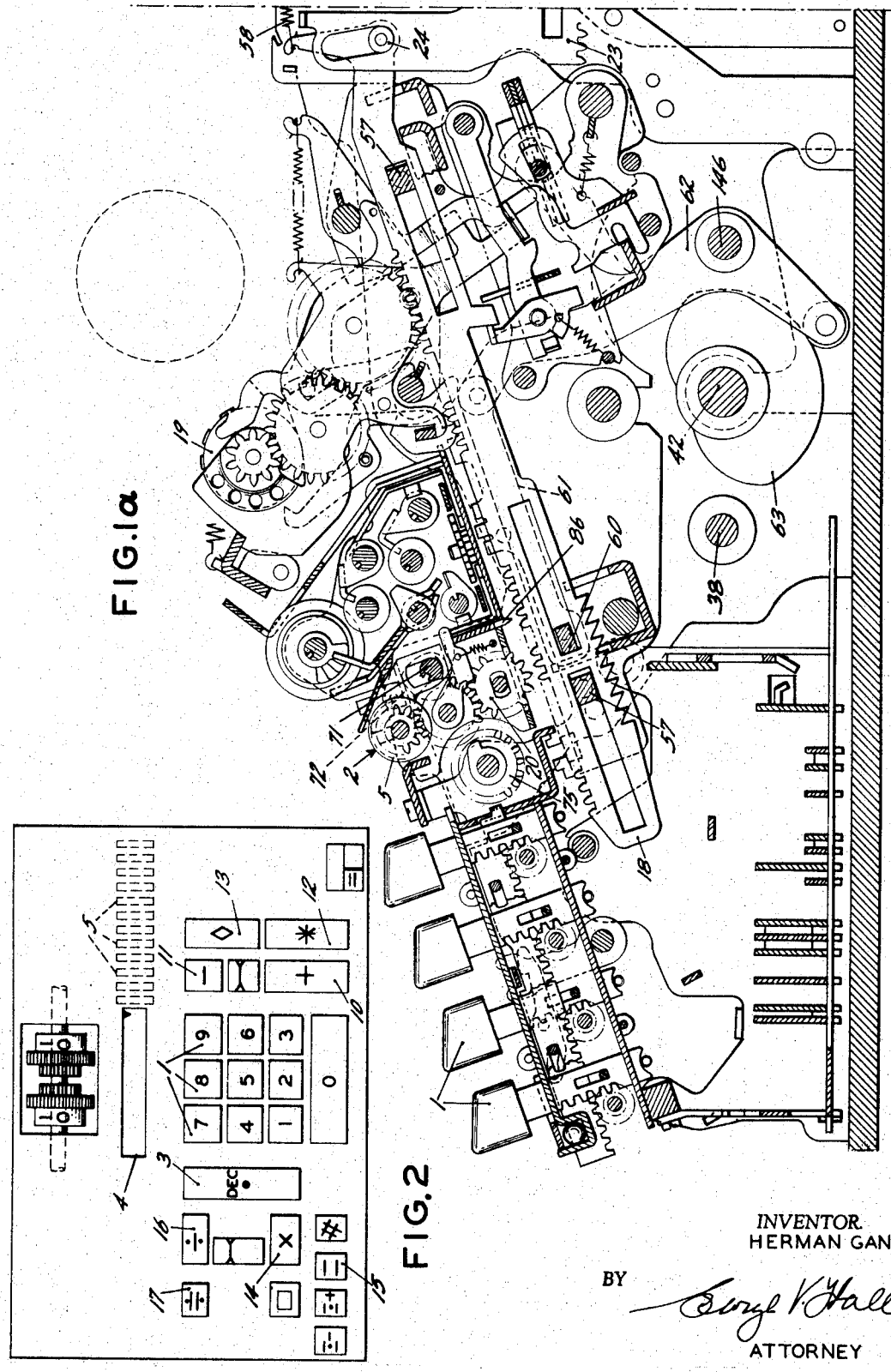

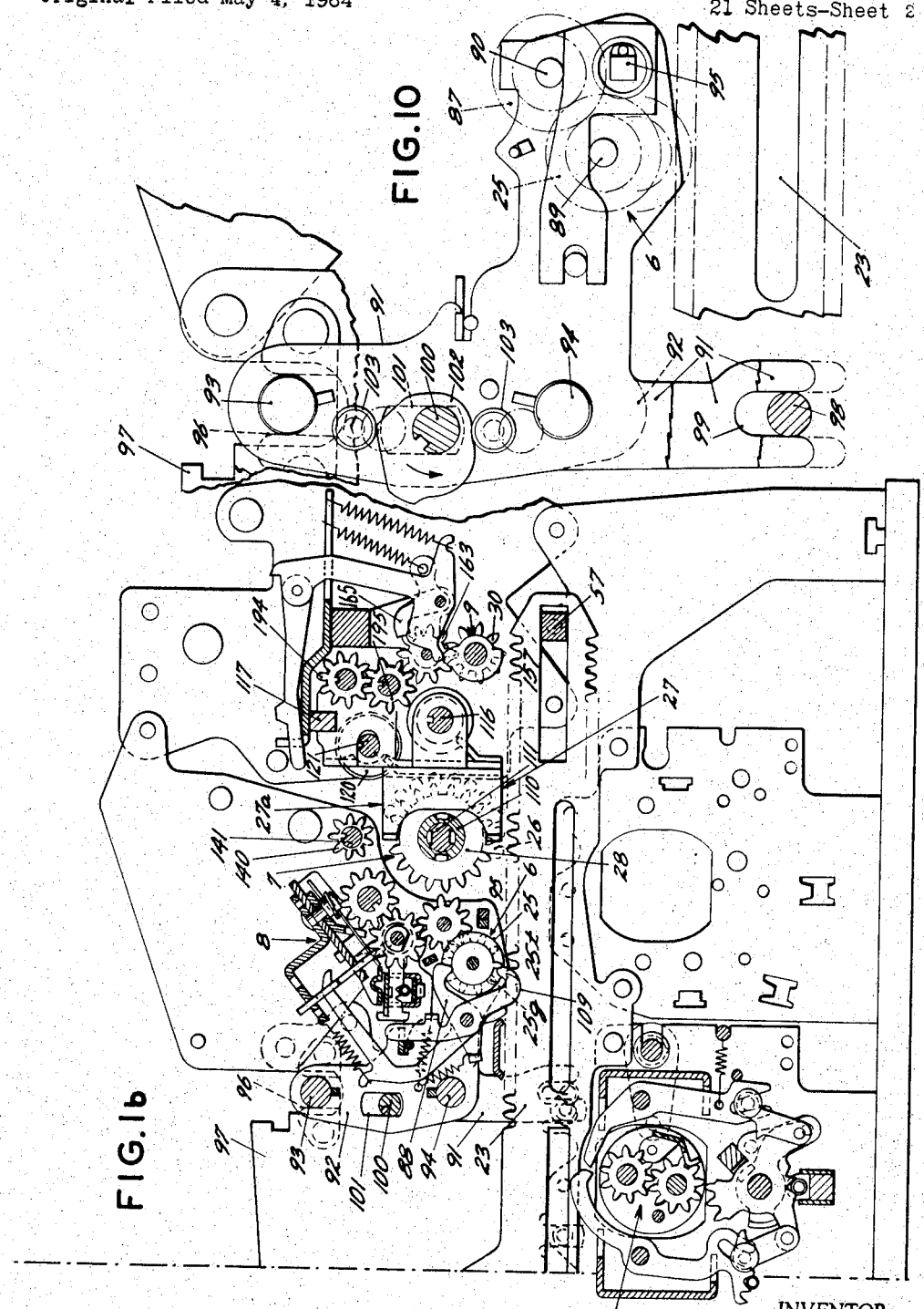

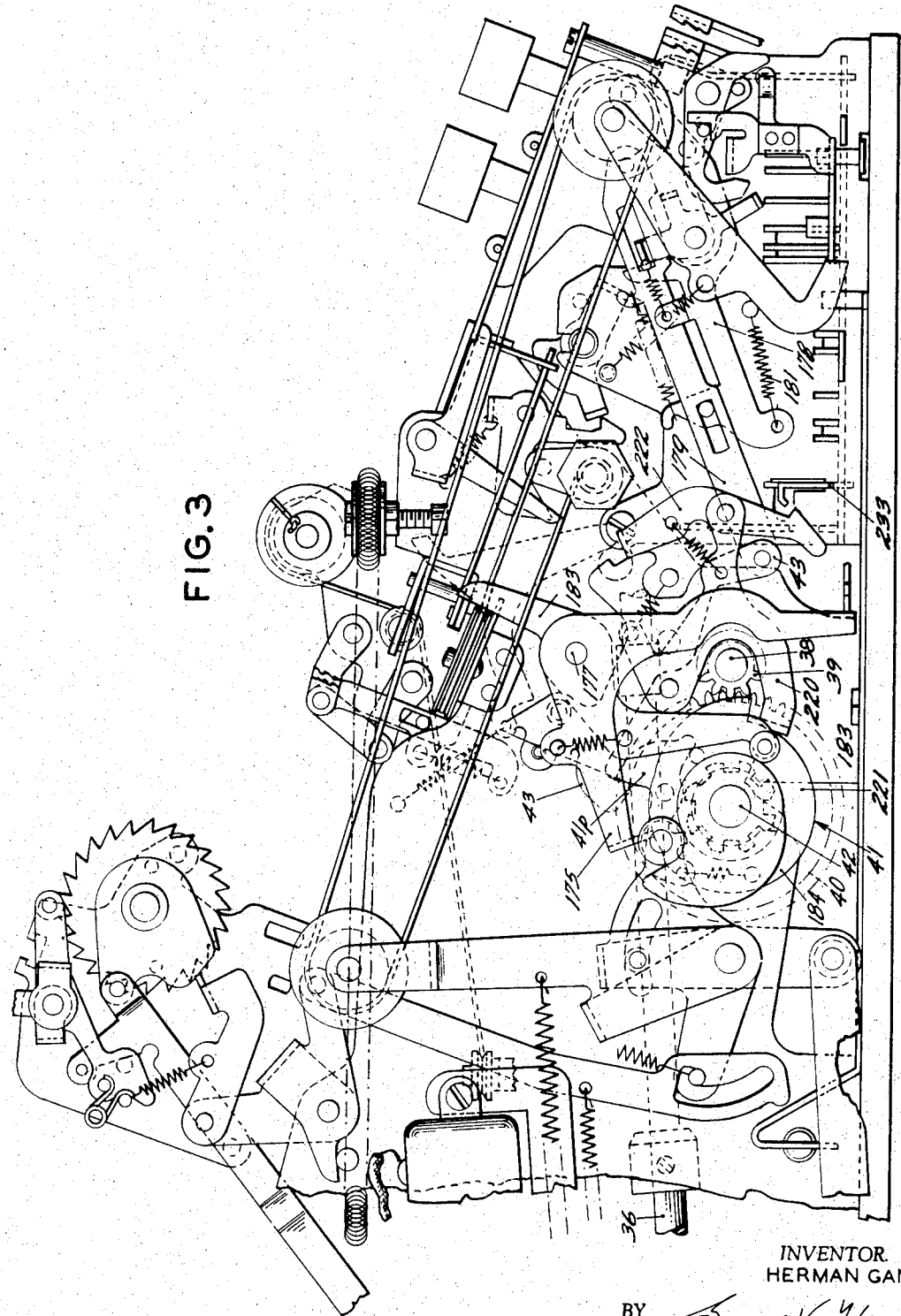

March 12, 1968     H. GANG     3,372,868
DIVISION CONTROL MEANS
Original Filed May 4, 1964     21 Sheets-Sheet 5
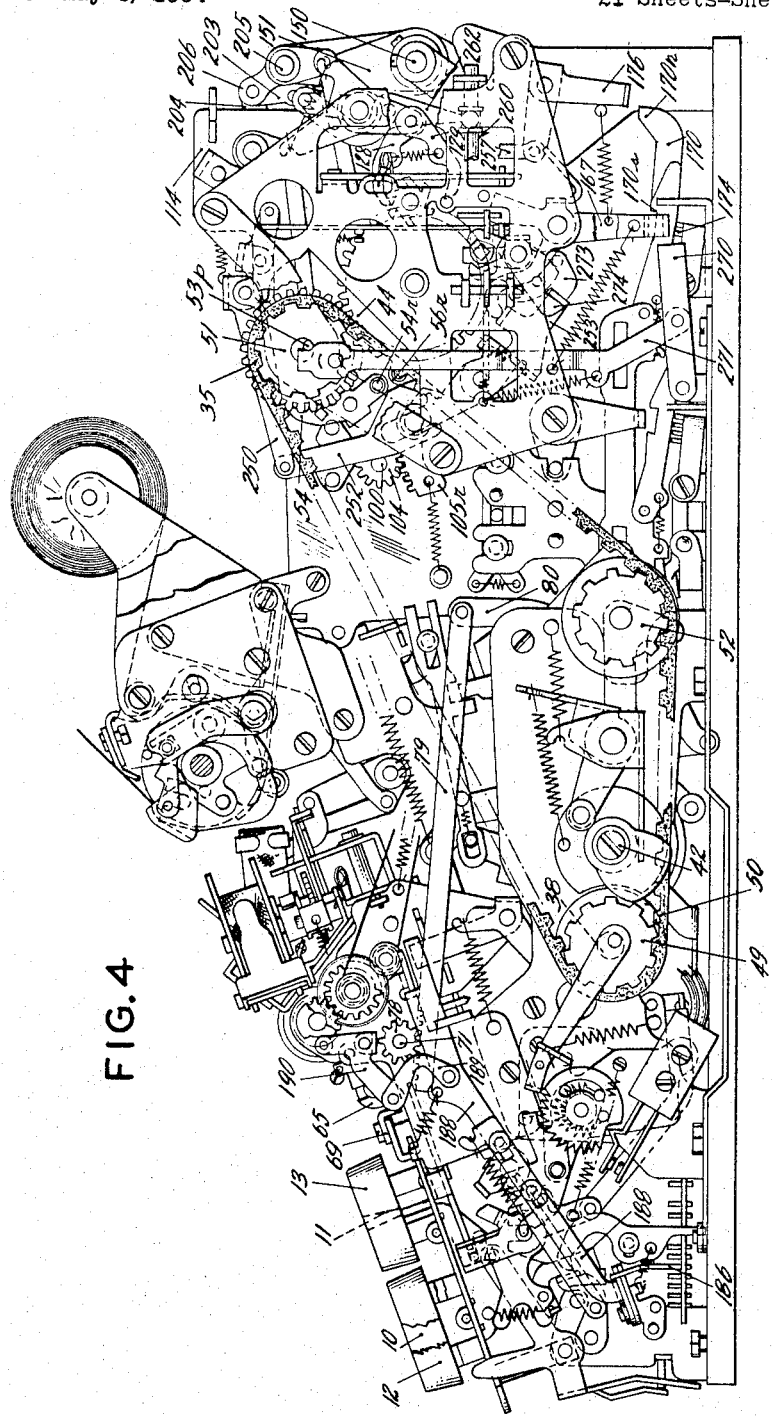
INVENTOR.
HERMAN GANG
BY
ATTORNEY March 12, 1968     H. GANG     3,372,868
DIVISION CONTROL MEANS Original Filed May 4, 1964     21 Sheets-Sheet 7

INVENTOR.
HERMAN GANG

BY

ATTORNEY

March 12, 1968     H. GANG     3,372,868
DIVISION CONTROL MEANS
Original Filed May 4, 1964     21 Sheets-Sheet 9

INVENTOR.
HERMAN GANG
BY
ATTORNEY

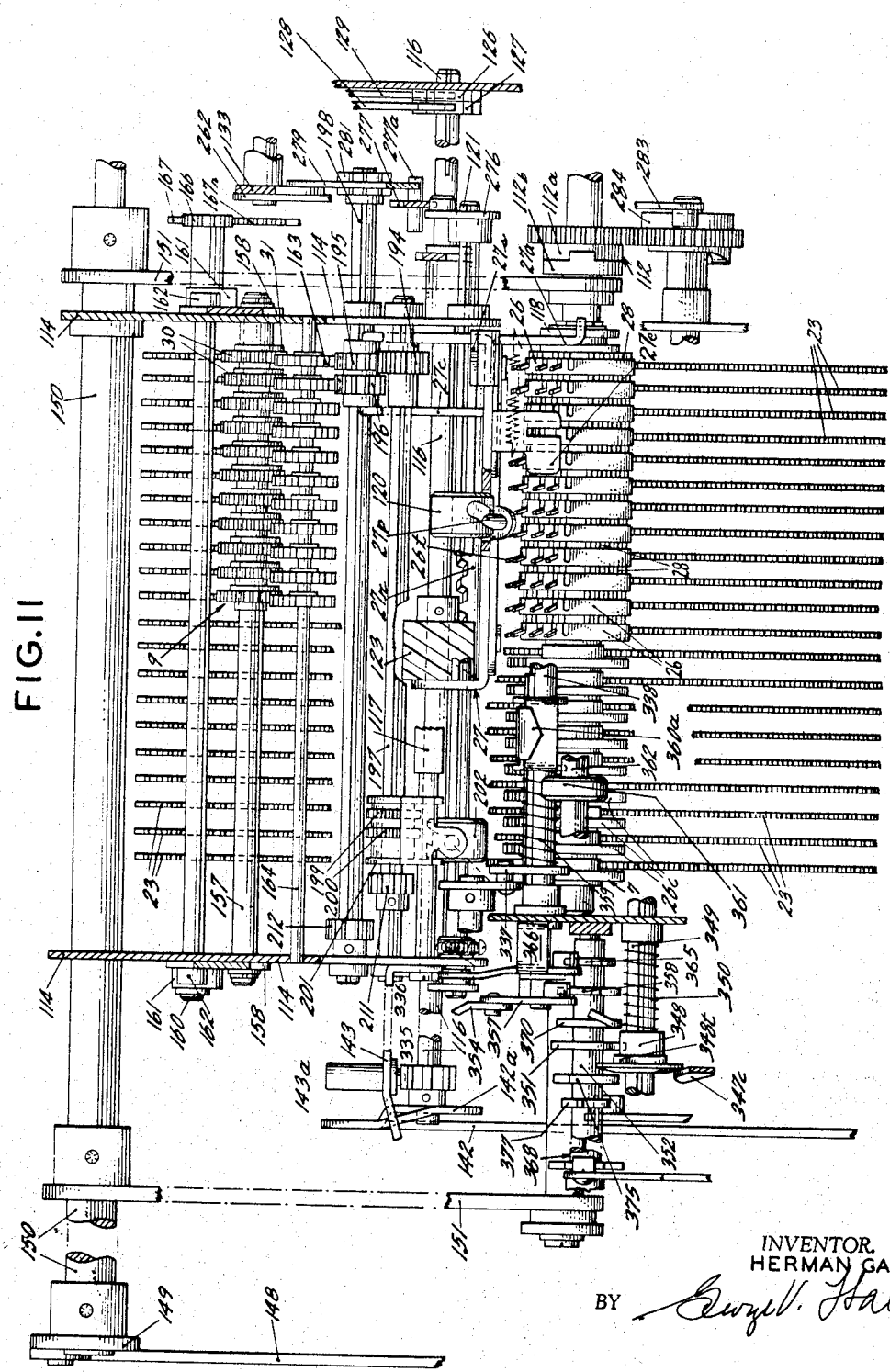

March 12, 1968  H. GANG  3,372,868
DIVISION CONTROL MEANS
Original Filed May 4, 1964  21 Sheets-Sheet 12

INVENTOR.
HERMAN GANG
BY
ATTORNEY

March 12, 1968     H. GANG     3,372,868
DIVISION CONTROL MEANS
Original Filed May 4, 1964     21 Sheets—Sheet 13

INVENTOR.
HERMAN GANG
BY
ATTORNEY

March 12, 1968 H. GANG 3,372,868
DIVISION CONTROL MEANS
Original Filed May 4, 1964 21 Sheets-Sheet 15

INVENTOR.
HERMAN GANG
BY
ATTORNEY

March 12, 1968  H. GANG  3,372,868
DIVISION CONTROL MEANS
Original Filed May 4, 1964  21 Sheets-Sheet 16
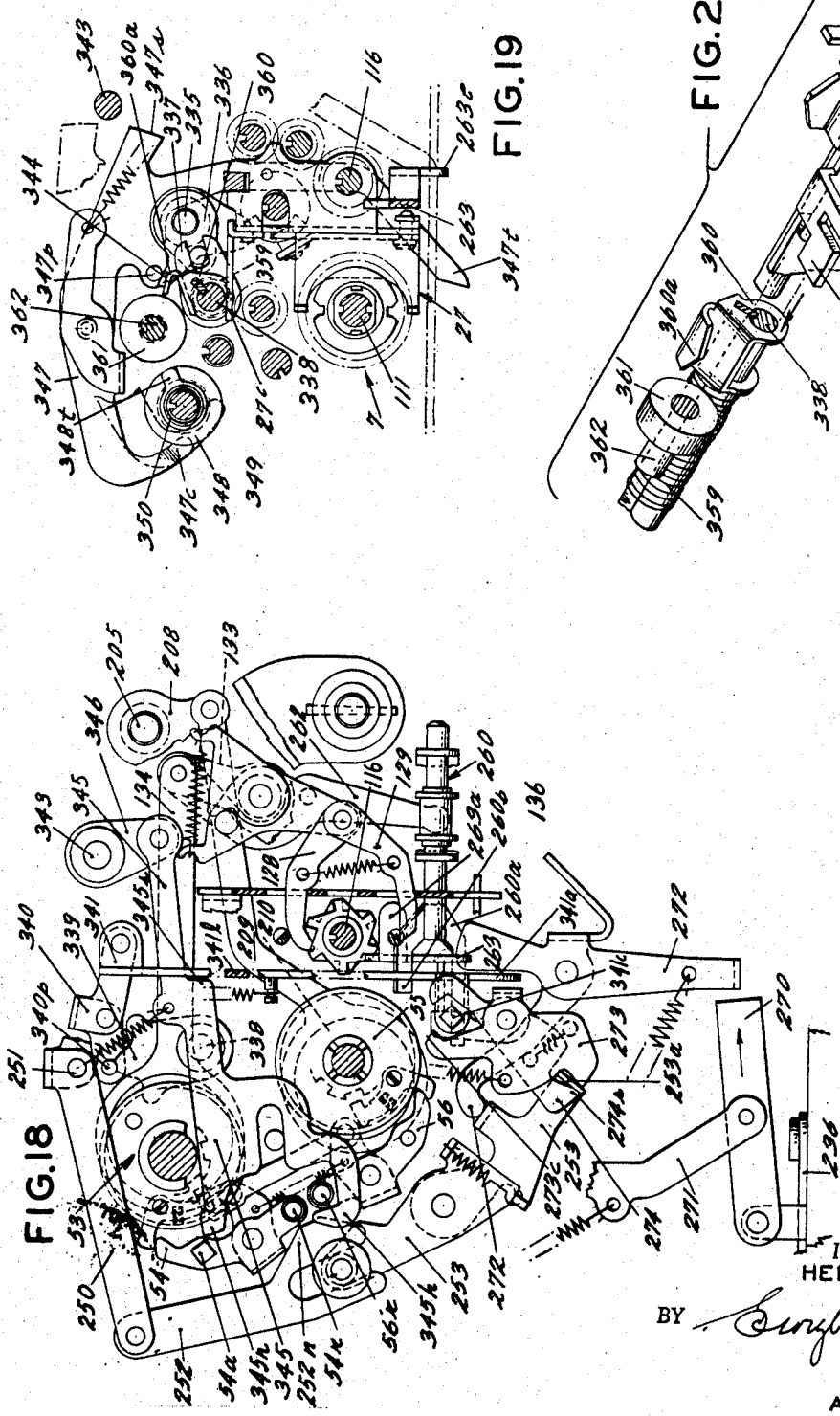
INVENTOR.
HERMAN GANG
BY *Ewyl V. Hall*
ATTORNEY March 12, 1968  H. GANG  3,372,868
DIVISION CONTROL MEANS
Original Filed May 4, 1964  21 Sheets-Sheet 17
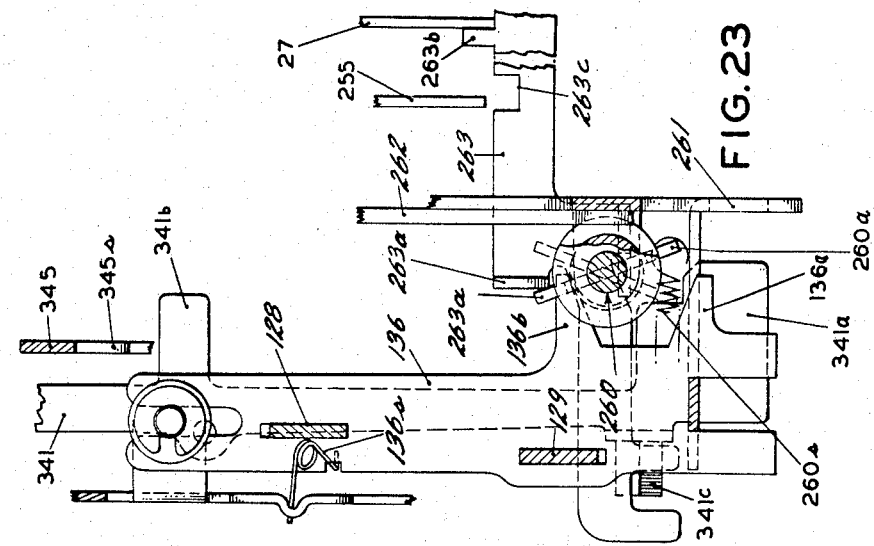
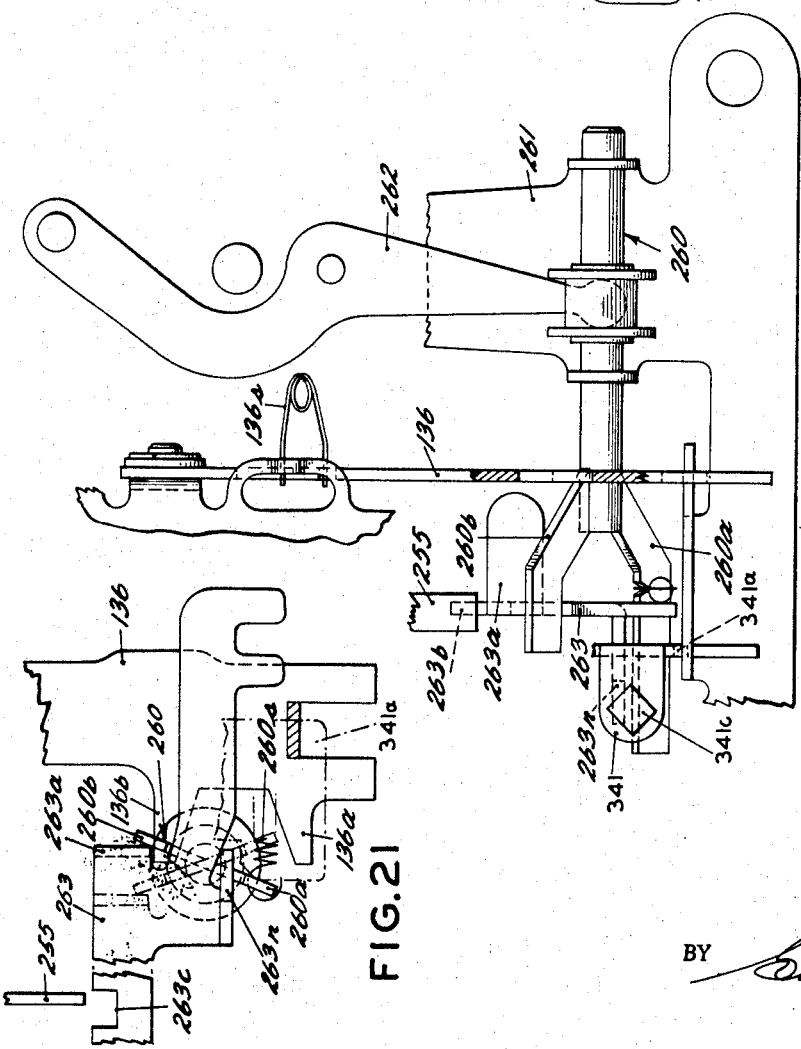
INVENTOR.
HERMAN GANG
BY 
ATTORNEY March 12, 1968  H. GANG  3,372,868
DIVISION CONTROL MEANS Original Filed May 4, 1964

INVENTOR.
HERMAN GANG
BY George V. Hall
ATTORNEY

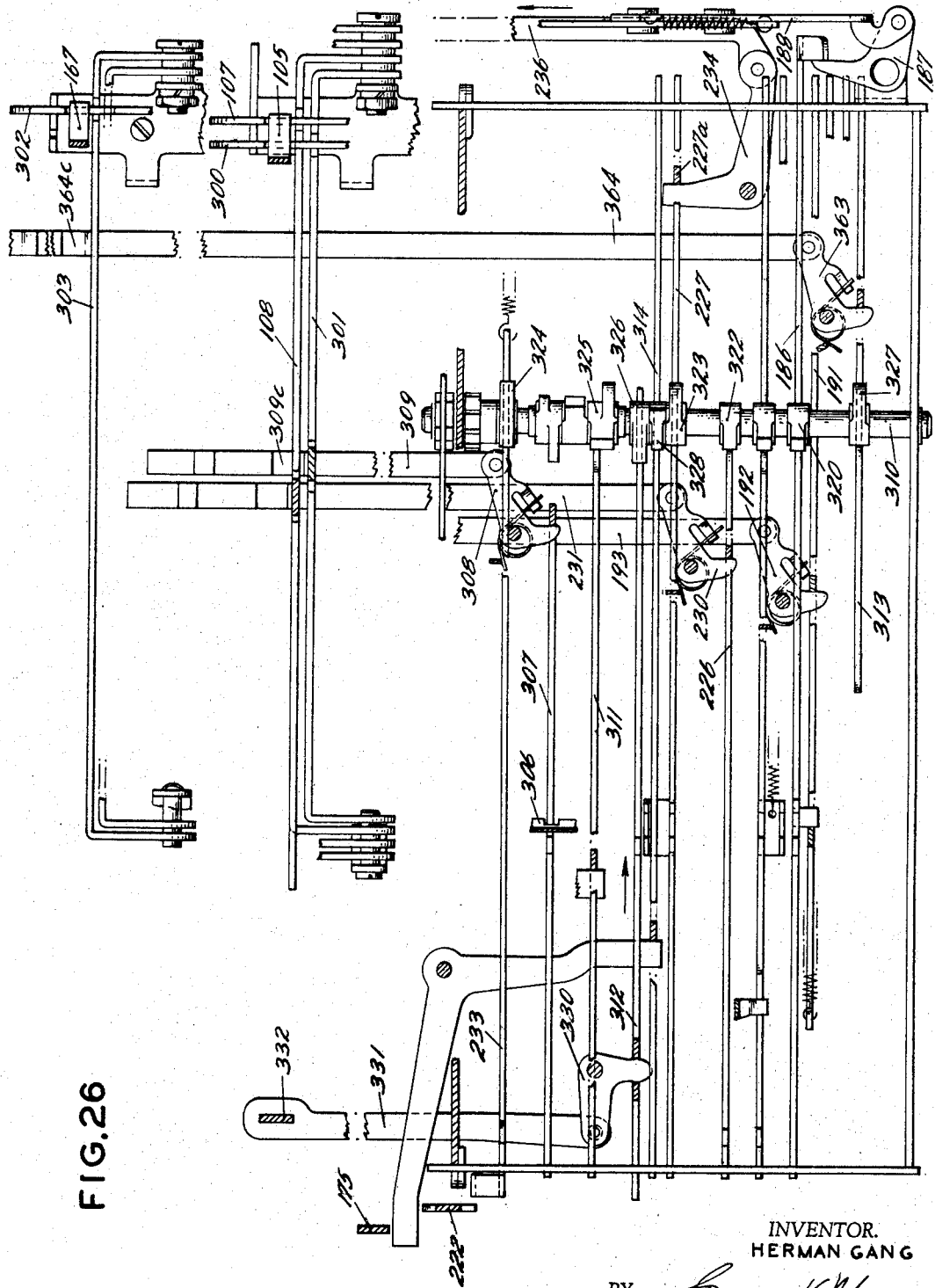

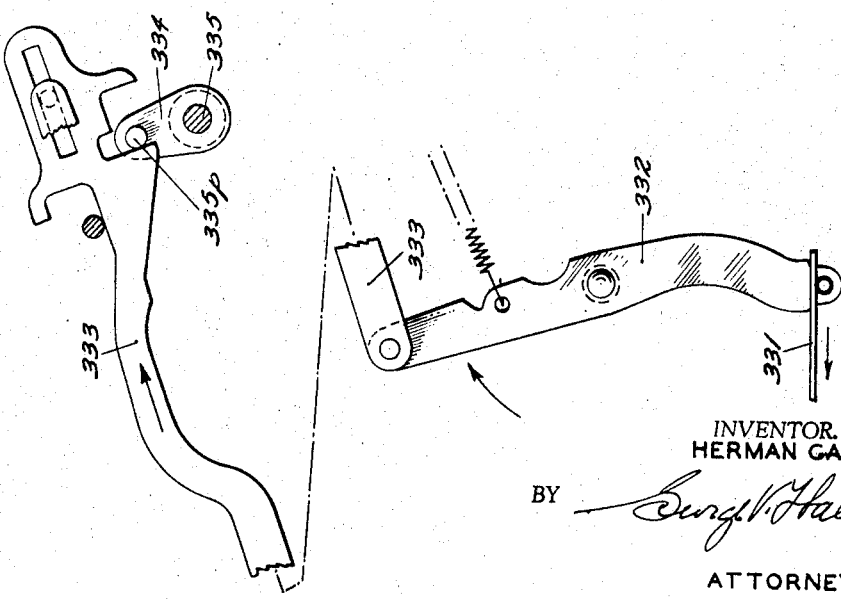

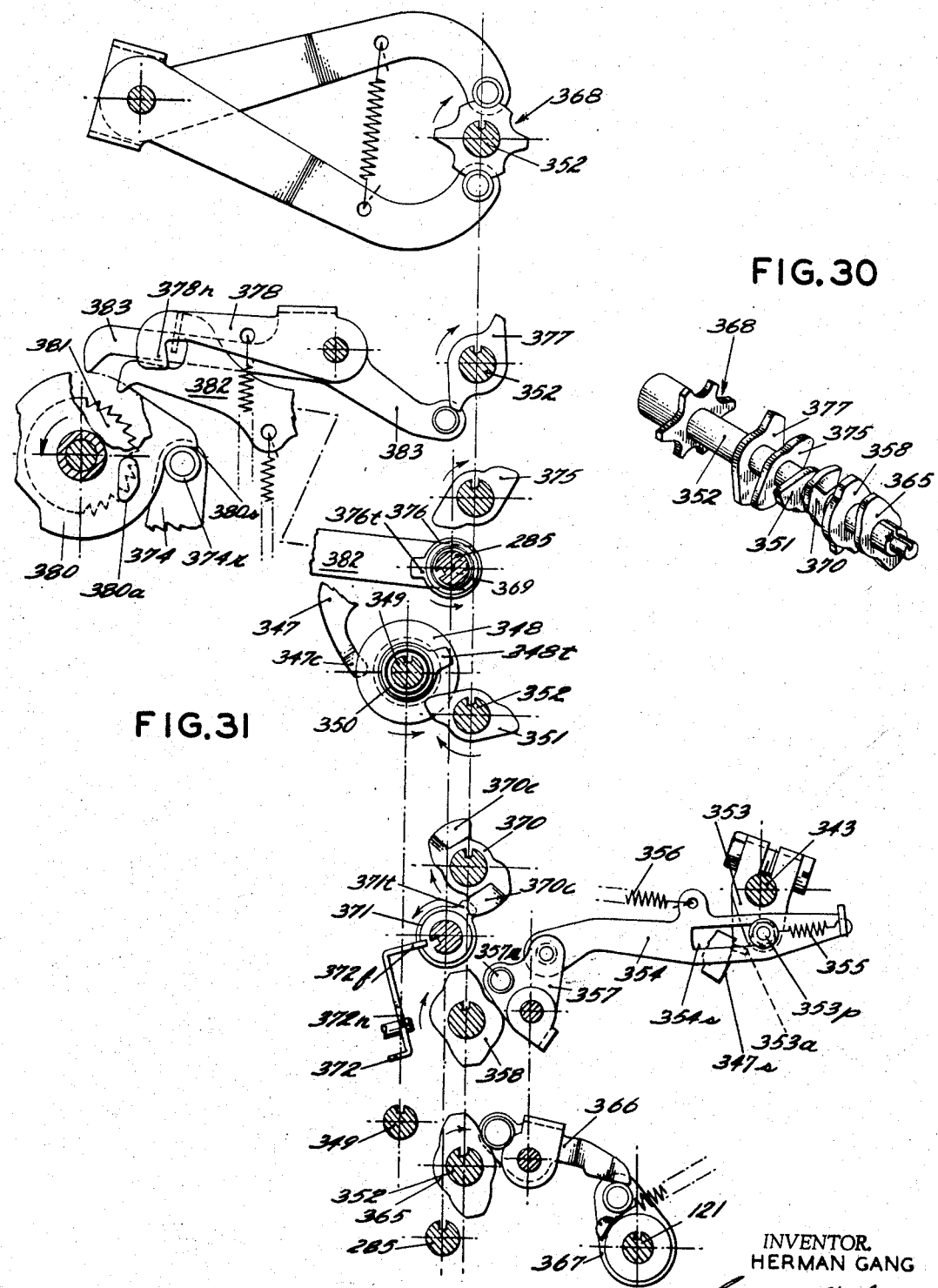

United States Patent Office 3,372,868
Patented Mar. 12, 1968

3,372,868
DIVISION CONTROL MEANS
Herman Gang, Morris Plains, N.J., assignor to Litton Business Systems, Inc., a corporation of Delaware
Continuation of application Ser. No. 364,621, May 4, 1964. This application Mar. 31, 1966, Ser. No. 539,222
15 Claims. (Cl. 235—63)

This application is a continuation of my copending application Ser. No. 364,621, filed May 4, 1964, and is assigned to the same assignee as that invention.

This invention relates to mechanism for performing division in calculating machines, and particularly in machines of the type having rotary differential digital actuators and means for effecting relative ordinal shift between such actuators and a dividend register.

The performance of division in these calculating machines has always been a very slow and complicated process. No mechanisms existed which were capable of operating in the manner needed for high speed division. One basic way of performing high speed division is by using complementary addition instead of subtraction. In other words, the complement of the divisor is added to the dividend, instead of subtracted, to obtain the quotient. An early version of this concept is described in British Patent 789,854, published Jan. 29, 1958. Applicant now provides the control mechanisms for embodying the complementary method within the above type of calculating machine.

It is the primary object of the invention to provide improved division control mechanism for the above type of machine.

A more specific object is to provide improved division control mechanism in a machine of the above type wherein the rotary differential digital actuators are unidirectional.

The unidirectional rotary digital actuators of the machine in which the devices of the invention are herein described effect subtraction by additive complemental registration. It is therefore a further and yet more specific object of the invention to control the sign of registration of such actuators in a novel division program.

In the machine in which the devices of the invention are herein disclosed, the rotary digital actuators into which a divisor is entered are ordinally shiftable with respect to a dividend register. A counter or quotient register is fixed with respect to the dividend register, and means shiftable with the digital actuators is operable to register the successive quotient digits in the quotient register. Division is effected by the well-known subtract, add, shift method, and the devices of the invention are operable to adjust the digital actuators alternatively for normal additive or for complemental additive (subtractive) operation in the program of division.

Reciprocatory actuator racks are alternatively operable to enter a selected dividend value in the dividend register and a divisor value in the rotary digital actuators. The excursions of the racks are controlled by a selector carriage into which a value is set upon successive depression of keys of a ten key keyboard corresponding to the digits of the value from higher to lower orders in the usual manner.

Digit type members of printing mechanism are adjusted from normal zero position in accordance with the excursions of the actuator racks and then the printing mechanism is operated. After the printing operation, the racks in their return strokes, restore the type members. Accordingly operation of the racks in entry of a dividend and a divisor will adjust the type members for printing of those factors.

At the conclusion of quotient registration, excursions of the racks are controlled in a first total taking operation in accordance with the values in the quotient register to print a quotient, and then in a second total taking operation in accordance with the values in the dividend register to print a remainder.

The machine in which the division control mechanism of the present invention is embodied also embodies multiplication control mechanism fully disclosed in applicant's copending application Ser. No. 338,242, filed on Jan. 16, 1964. In the following description with reference to the accompanying drawings, parts corresponding to parts disclosed in said application will be identified by like reference numerals insofar as practical. Furthermore, reference is made to said application for a detailed description of mechanism referred to herein but not described in detail.

In the drawings:

FIGS. 1a and 1b are a longitudinal section through the machine embodying the invention.

FIG. 2 is a plan view of the keyboard.

FIG. 3 is a left side view of the front portion of the machine including the main clutch and controls therefor.

FIG. 4 is a right side elevation of the front portion of the machine showing the drive means for the selection clutch, shift clutch and registration clutch.

FIG. 10 is a fragmentary detail of the adjusting means for the dividend register.

FIG. 11 is a plan view of the rotary digital actuators and their carriage, the carriage shifting means, and the quotient register.

FIG. 18 is a detail right side elevation of the registration and shift clutches, control means therefor, and shift direction control means.

FIG. 19 is a detail section, looking toward the left, of control devices for the division program means.

FIG. 20 is an exploded perspective of parts shown in FIG. 19.

FIGS. 21, 22, and 23 are detail views of the carriage shift direction control means.

Figures 24, 25:
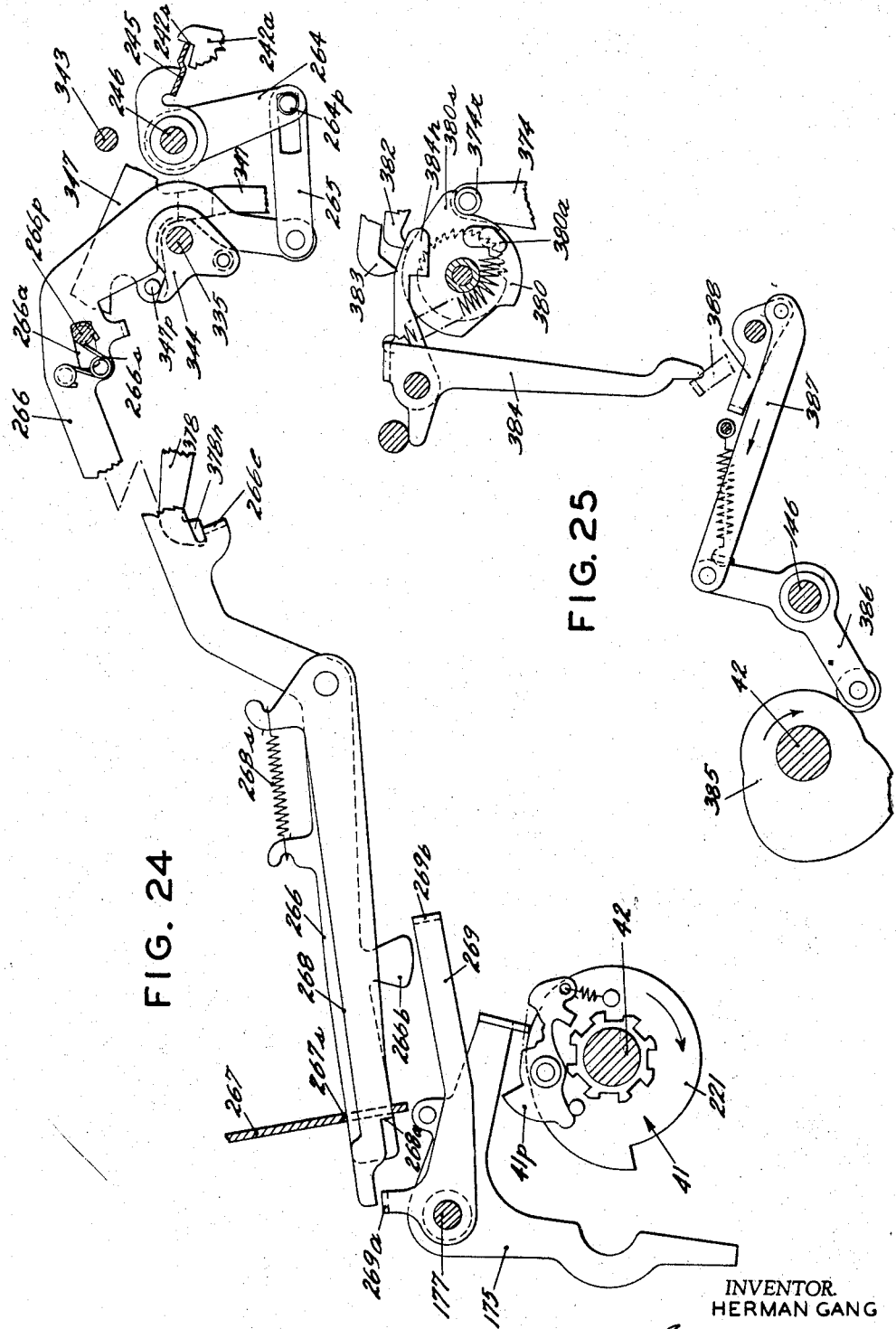

FIG. 24 is a detail right side view of mechanism operable in the control of the main clutch in total taking operations.

FIG. 25 is a detail right side view of program control mechanism operable if the machine is not normally operated.

FIG. 26 is a plan view of the program slides and associated mechanism.

FIG. 27 is a right side detail view of setting means for the program control devices.

FIG. 28 is a right side detail view of program control devices and of the overdraft sensing means.

FIG. 29 is an exploded perspective view of parts shown in FIG. 28.

FIG. 30 is a perspective view of the program shaft including means for controlling the sequential registering and shift operations.

FIG. 31 is a mechanical schematic including the program shaft of FIG. 30 and associated mechanism.

*General description*

Referring to FIGS. 1a, 1b, 2, the machine has, at its front, a keyboard including the usual grouping of numeral keys 1 of the digital values "0" to "9" inclusive for controlling entry of selected values into a selector carriage 2 which has a twelve digit capacity as later described. To the rear of keys 1 is a window 4 for displaying numeral wheels 5 which are successively moved into view as digits are entered into carriage 2 and are adjusted in accordance with the values of the digits.

Automatic decimal point printing mechanism is incorporated in the machine. A decimal point key 3 located to the left of keys 1 is adapted to be depressed in proper decimal sequence with keys 1 when a value to be entered into carriage 2 includes decimal digits. The present invention, however, is not concerned with this mechanism which is fully disclosed in applicant's co-pending application Ser. No. 222,144, filed on Sept. 7, 1962, now Patent No. 3,194,495.

To the right of numeral keys 1 are function control keys including an add key 10, a subtract key 11, a total key 12, and a subtotal key 13. To the left of numeral keys 1 are function control keys including a multiplicand entery key 14, a multiplier entry key 15, a dividend entry key 16 and a divisor entry key 17.

There is an ordinal series of twenty-one reciprocatory front digital actuator racks 18, the twelve lowest orders of which may be controlled by selector carriage 2, and entrained with the racks are digit type wheels 19 of a printing unit. Reference is made to the aforenoted application Ser. No. 222,144 for a complete disclosure of the printing unit.

Selector carriage 2 includes a series of twelve storage selector gears 20. Selector carriage 2 is normally positioned, in the usual manner, with the highest order selector gear one ordinal position to the right of the lowest order rack 18. Upon successive depression of digit keys 1, the values of the depressed keys respectively are entered into the selector gears from higher to lower orders, and the carriage is step shifted toward the left to bring the set selector gears 20 successively from higher to lower orders into controlling position with respect to racks 18 from lower to higher orders.

Racks 18 are reciprocably operable in forward and return strokes as later described. Forward stroke refers to the first stroke of each cycle, as is customary, regardless of the direction with respect to the machine. In this machine the forward stroke of the racks is toward the rear of the machine. A rear digital actuator rack 23 is coupled by roller and slot connection 24 with each front digital actuator rack 18. The pairs of racks 18, 23 therefore are reciprocated in unison.

A product-dividend register 6 is nonshiftable and comprises an ordinal series of twenty-one numeral wheels 25. Racks 23 are operable to enter a dividend set in selector carriage 2 into register wheels 25 or to zeroize said wheels in a total taking operation of a value such as a product registered therein or a dividend remainder.

A digital actuator unit 7 including an ordinal series of twelve rotary differentially settable digital actuators 26 is unidirectionally driven at high speed independently of racks 18 and 23 and is connected with a carriage 27 for ordinal shifting with respect to product-dividend register 6 in programs of multiplication and division. Subtraction is performed by complemental registration and therefore actuator unit 7 includes nonsettable nines complement actuators 26c (FIGS. 11, 12) which are located to the left and are rotatably driven and shifted with differential actuators 26. Values are entered into actuators 26 by racks 23 in accordance with a value entered into selector carriage 2 after operation of means for zeroizing said actuators from a prior setting.

Nonshiftable rotary tens transfer actuators 8 extend the length of the product-dividend register 6 and are operable in time with digital actuators 26, 26c. The invention is not concerned with the operation of the tens transfer actuators and reference is made to applicant's Patent No. 3,065,908 for a complete disclosure.

A nonshiftable multiplier-quotient register 9 comprises an ordinal series of eleven storage gears 30, the ten lowest orders of which are associated with the ten lowest order racks 23 for entry of a multiplier. The eleventh order is provided for shortcut multiplication. The associated racks 23 are operable to enter a value set in selector carriage 2 into gears 30, or to zeroize the gears in a total taking operation of a value registered therein. Counting means shiftable with carriage 27, in which digital actuator unit 7 is mounted, is operable in a program of multiplication, to count out a multiplier registered in gears 30 or to register a quotient therein in a program of division.

Values set in selector carriage 2 may be added or subtracted in an accumulator register 34 by operation of racks 23 in response to depression of add and subtract keys 10, 11. Also values registered in product-dividend register 6 may be transferred to accumulator 34 by operation of racks 23.

The above briefly outlines the organization and relationship of basic machine parts. With this in mind, various of the above and other associated mechanisms will be described in detail as considered necessary for a complete disclosure and understanding of the invention.

*Machine drive*

The machine is driven by an electric motor (not shown) located at the left rear of the machine. Drive shaft 36 (FIGS. 3, 3A) of the motor extends forwardly to a gear box 37, the gearing of which drives an output shaft 38 extending transversely of the machine.

A pinion 39 is secured at the left end of shaft 38 and engages a spur gear 40 which is fast with the driving member of a cyclically operable main clutch 41. Clutch 41 is of well-known construction wherein the driving member comprising a toothed wheel is adapted to be engaged by a spring urged pawl 41p mounted on the driven member which is secured to the machine main drive shaft 42. Normally a clutch lever 43 is held counterclockwise (FIG. 3) where it is engaged by a nose of pawl 41p to disengage the clutch in full cycle position. Upon clockwise movement of clutch lever 43, pawl 41p will be released to engage clutch 41 which, during each cycle, control means for reciprocating actuator racks 18, 23 and for operating the printing mechanism. These operations including control of clutch 41 will be described later.

The driving member of an auxiliary clutch 45 is fast on main drive shaft 42 driven by main clutch 41. The driven member of clutch 45 carries a spring urged pawl 45p having a tooth adapted to engage a single recess in the driving member to engage the clutch. A forwardly extending clutch lever 46 has its rear end normally engaging pawl 45p to disengage the clutch.

Lever 46 is rocked to release pawl 45p thereby engaging auxiliary clutch 45. However, it will be noted that the auxiliary clutch can only be operated simultaneously with main clutch 41 which operates main drive shaft 42. Clutch 45 is operated in connection with certain clearing and divisor entering operations for digital actuators 26. These operations and the control of clutch 45 will be described later.

Figure 3A:
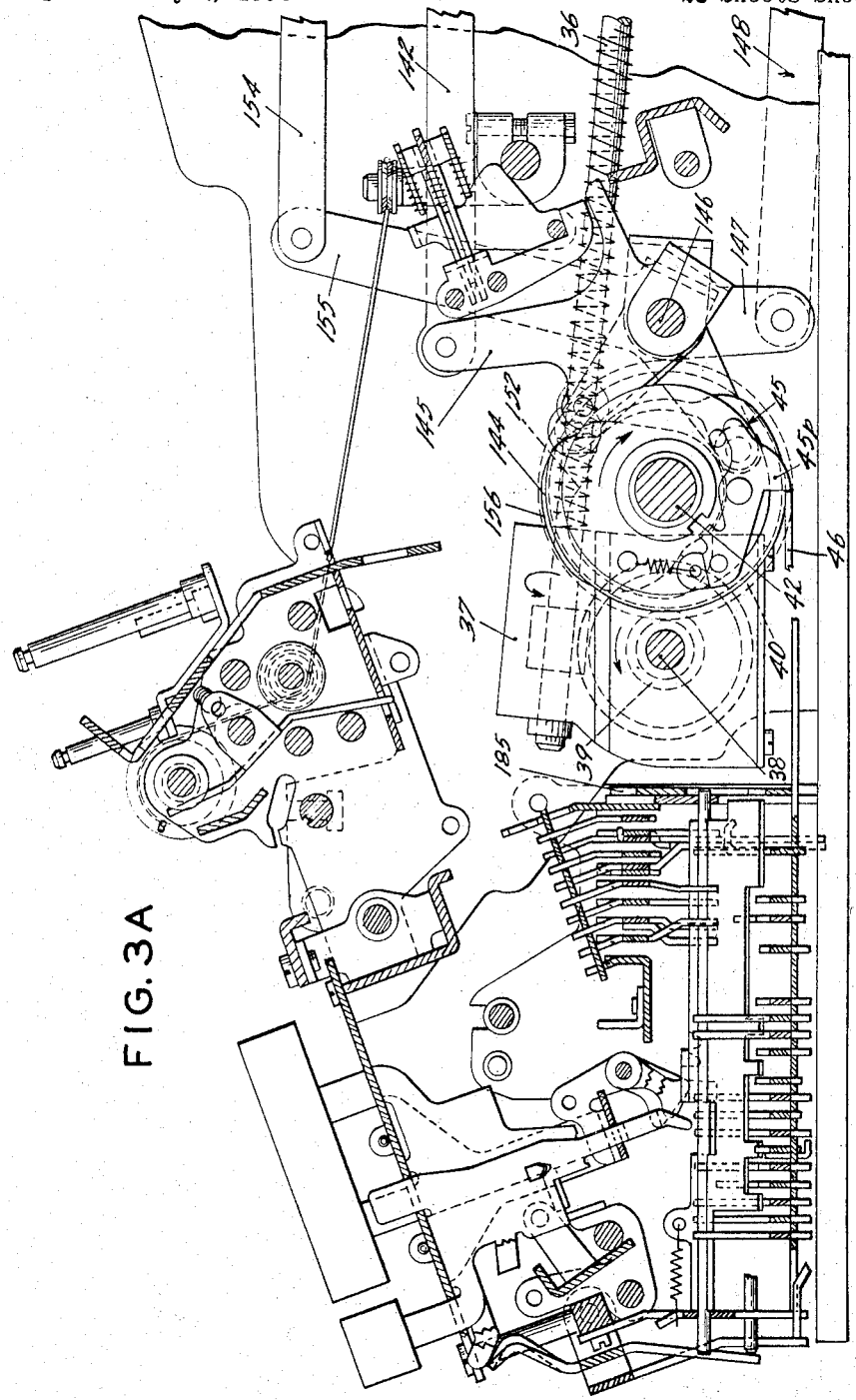
FIG. 3A is a longitudinal section through the front portion of the machine showing the machine drive means including the auxiliary clutch driven by the main clutch.
Figure 6:
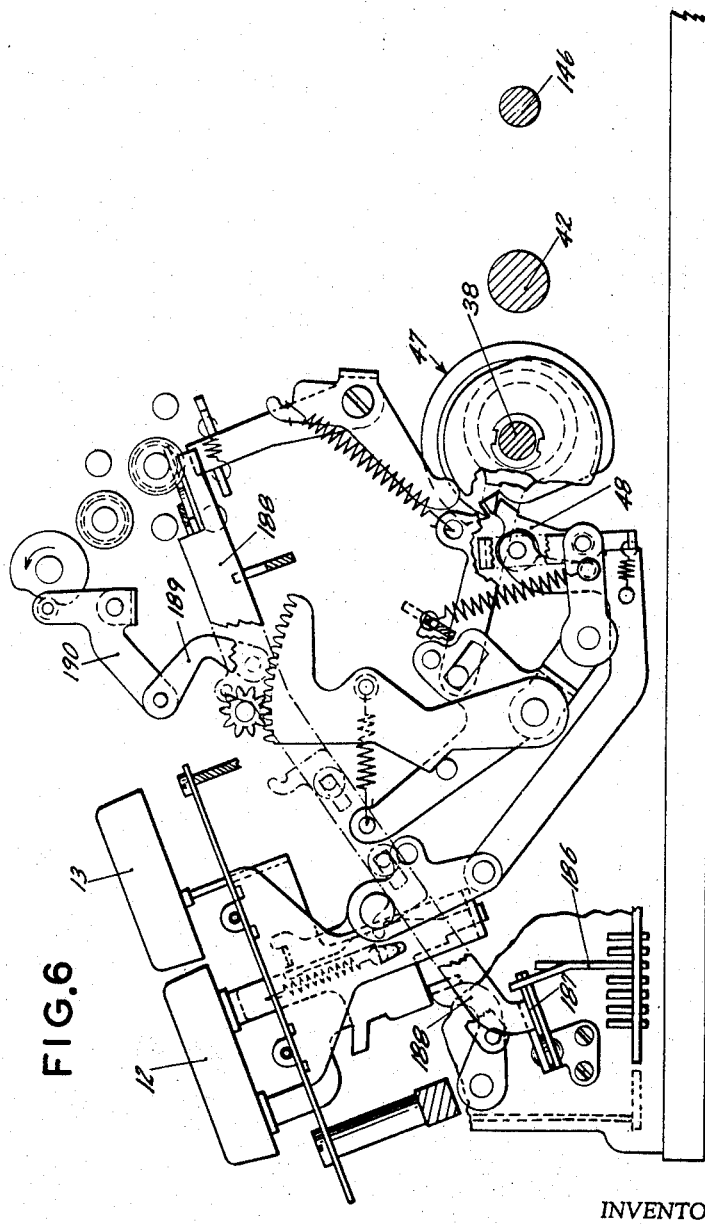
FIG. 6 is a fragmentary side elevation of the single cycle clutch operable in entry of digits in the selector carriage and in control of the carriage escapement means.

A cyclically operable selection clutch 47 (FIG. 6) is located inwardly of the machine right side frame with the driving member of said clutch fixed on output shaft 38 of gear box 37 (FIG. 3A). Clutch 47 is normally held disengaged in full cycle position by a clutch lever 48 held clockwise. The clutch is engaged upon counterclockwise movement of lever 48 to release a spring urged pawl on the driven member to engage the driving member of the clutch. Clutch 47 is operable upon each depression of a numeral key 1 in connection with entry of the value of the depressed key into selector carriage 2 and step shifting of said carriage as will be discussed later.

A cog wheel 49 (FIG. 4) is fast on the right end of shaft 38 exteriorly of the right side frame. Cog wheel 49 drives a cog belt 50 which, at the upper rear of the machine, drives a cog wheel 51. An idler cog wheel 52 is adjustable to regulate the tension of belt 50.

The driving member of a cyclically operable shift clutch 53 (FIG. 18) is secured for rotation with cog wheel 51. Clutch 53 is of the same general type as main clutch 41 and selection clutch 47. Clutch 53 therefore includes a spring urged pawl on the driven member which is adapted to engage the driving member to engage the clutch. A clutch lever 54 is normally spring held clockwise to engage the clutch pawl and thereby hold the clutch in full cycle disengaged position. Counterclockwise movement of lever 54 will release the clutch pawl to engage the clutch. Clutch 53, during each cycle, as later described, operates means for shifting carriage 27 for digital actuator unit 7 one ordinal position with respect to product-dividend register 6.

A gear 35 (FIG. 4) is fixed for rotation with cog wheel 51 and drives a gear 44. Secured for rotation with gear 44 is the driving member of a registration clutch 55 (FIG. 18) which drives rotary digital actuators 26, 26c of unit 7 as later described. Clutch 55 is of substantially the same structure as shift clutch 53 and therefore includes a spring urged pawl on the driven member which is adapted to engage the driving member to engage the clutch. A clutch lever 56 is normally spring held counterclockwise to engage the clutch pawl and thereby hold the clutch in full cycle disengaged position. Clockwise movement of lever 56 will release the clutch pawl to engage the clutch.

*Digital actuator racks*

Front and rear digital actuator racks 18, 23 (FIGS. 1a, 1b) which are connected by couplings 24, are biased toward the rear of the machine by springs 58 attached to the rear of racks 18; but however are normally held toward the front against the tension of springs 58 by a transverse restore bail 60 engaging the front ends of longitudinal slots in racks 18.

Bail 60 is supported at its ends by a pair of rearwardly extending links 61 each which at its rear is pivotally connected to the end of an upstanding arm of a cam follower comprising a crank 62. Crank 62 is spring biased clockwise to engage a roller at the end of its other arm normally with the high part of a cam 63 fast on main drive shaft 42. Followers 62 therefore are normally held counterclockwise thereby holding links 61, bail 60, and racks 18, 23 forwardly against the tension of springs 58.

During each cycle of main clutch 41, followers 62 will be rocked clockwise and return under control of cams 63 thereby reciprocating bail 60 and permitting racks 18, 23 to be operated in forward strokes by springs 58 and restored in return strokes by said bail. As noted before, the forward strokes are toward the rear of the machine.

The extent of the forward strokes of racks 18, 23 is controlled in accordance with values entered into selector carriage 2 or in taking a total from product-dividend register 6 or multiplier-quotient register 9 as later described. In each cycle, there is a dwell before the forward strokes of racks 18, 23. During mid-cycle, there is a dwell of the racks during which printing occurs. Then there is a terminal dwell after return of the racks.

*The selector carriage*

Figure 5:
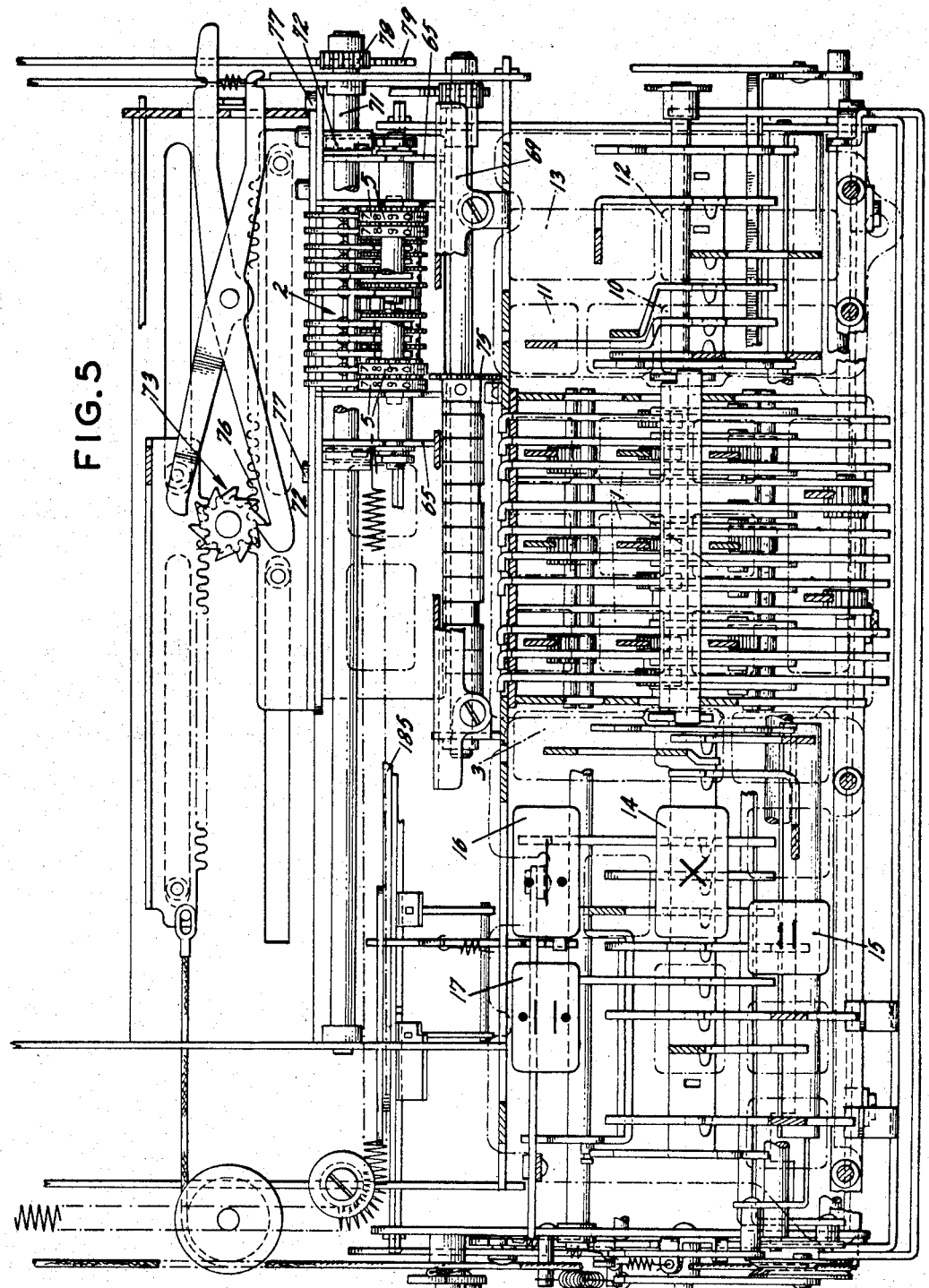
FIG. 5 is a top plan view of the machine with the cover plate removed showing the selector carriage, division keys and associated controls.
Figure 7:
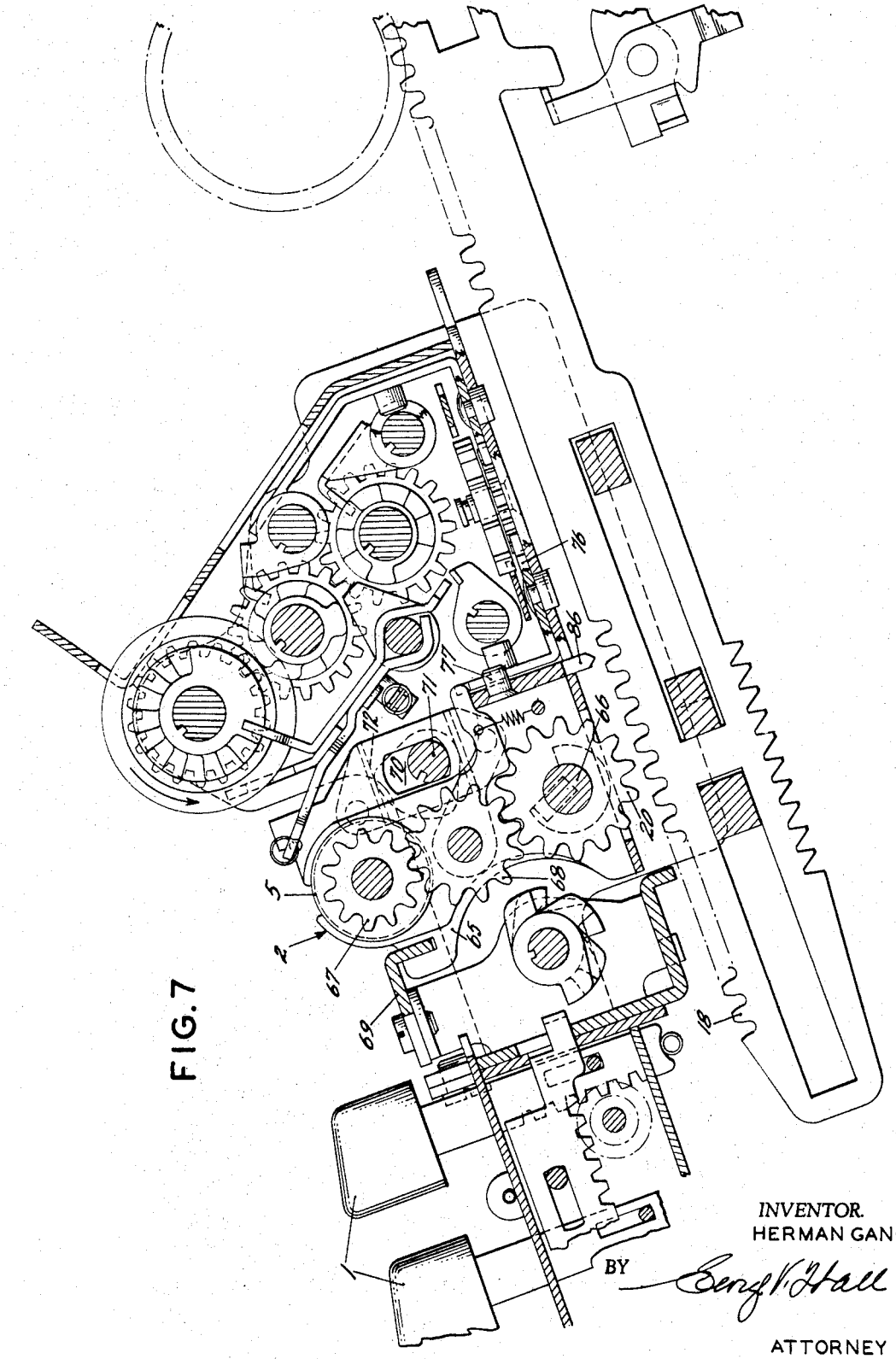
FIG. 7 is a right side fragmentary section of the selector carriage and the front actuator racks.
Figure 8:
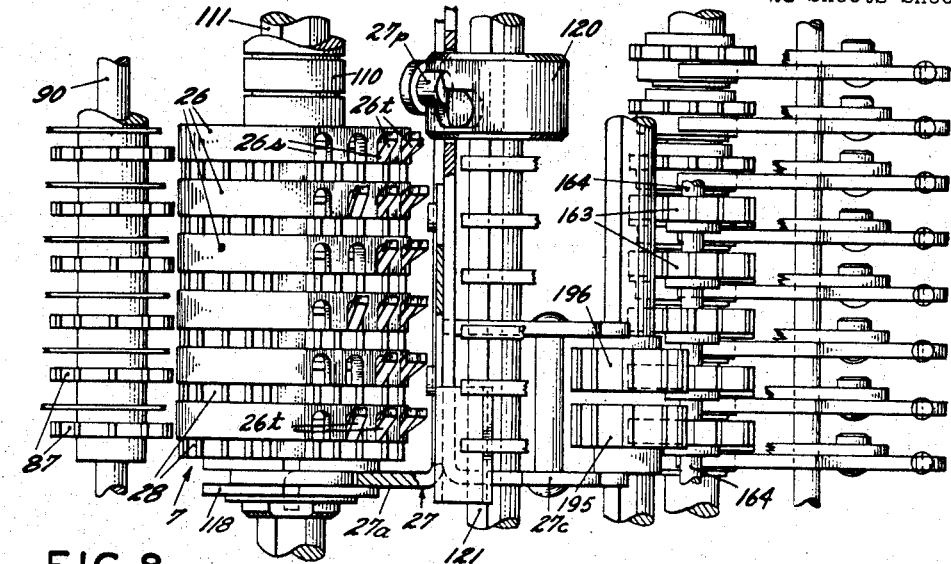
FIG. 8 is a top plan view of a series of the rotary digital actuators, the quotient register and associated control devices.

Selector carriage 2 (FIGS. 1a, 5, 7) includes a pair of end plates 65 between which selector gears 20 are mounted on a shaft 66.

Carriage 2 is ordinarily shiftable with respect to actuator racks 18 transversely of the machine and is vertically adjustable from a normal raised position to a lowered position wherein set selector gears 20 are engaged with ordinally aligned racks 18.

To permit ordinal shifting and vertical adjustment, carriage 2 is guided adjacent its front by a transverse fixed rail 69 and is supported adjacent its rear by a pair of like cams 70 which are splined on a transverse shaft 71 fulcrumed in the machine framing and extending exteriorly of the right side frame.

Cams 70 are trapped in cages 72 secured to the respective end plates 65 of carriage 2. Normally the high parts of the cams engage the tops of the cages and the low parts engage the bottoms; and therefore carriage 2 is held raised with selector gears 20 above racks 18. When carriage 2 is shifted transversely, cams 70, which support the carriage, are slid along shaft 71 to which they are splined. As later described, shaft 71 and cams 70 are rocked counterclockwise to lower carriage 2 to engage set selector gears 20 with ordinally aligned racks 18.

Upon depression of each digit key 1, means is operable to engage selection clutch 47 (FIG. 6) for a single cycle of operation. Means operable by the clutch during its cycle will rock a setting gear 75, a number of degrees determined by control means which is set upon depression of the digit key, to enter a value into the related selector gear 20 corresponding to the value of the depressed key. Furthermore, the clutch, subsequent to the value entering operation, will operate a carriage escapement 73 to shift the carriage one ordinal position to the left. Accordingly, upon successive depression of digit keys 1, values will be set into selector gears 20 from higher to lower orders and the gears will be shifted into controlling position with respect to racks 18 from lower to higher orders.

Reference is made to applicant's patent 3,044,697 for a complete disclosure of the means for controlling operation of selection clutch 47 and of the means for setting selector gears 20. Furthermore reference is made to applicant's copending application Ser. No. 222,144 for a complete disclosure of the escapement means 73 for shifting carriage 2 and of means for returning the carriage to home position upon operation of main clutch 41.

The carriage escapement means includes a rack 76 transversely slidable in the machine framing and which is secured to the rear of carriage 2 as described in said copending application. The means for securing the rack and carriage permits the aforenoted vertical adjustment of the carriage with respect to the rack. Means is selectively operable to vertically adjust carriage 2 to lowered position, upon operation of main clutch 41, during the initial dwell of racks 18 to engage the set selector gears 20 with the related racks prior to their forward strokes.

The means for vertically adjusting carriage 2 includes a pinion 78 (FIG. 14) fixed on the right end of shaft 71 on which cams 70 (FIG. 7) are splined. Pinion 78 is engaged by the front end of a rack arm 79 which is pivotally attached at its rear to an upstanding arm of a lever 80. Normally lever 80 is held counterclockwise against a limit stop by a spring thereby holding rack arm 79 forwardly and gear 78, shaft 71, and cams 70 clockwise. The clockwise position of cams 70 holds carriage 2 raised as previously described.

The end of a lower arm of lever 80 is adapted for engagement by an interponent comprising a forwardly extending finger 81 pivotally mounted at its rear on a slide 82. The front end of slide 82 is pivotally connected to a depending arm of a cam follower 83 which is spring biased counterclockwise to normally engage the low part of a cam 84 fast on main drive shaft 42 and hold said slide toward the rear of the machine. Upon each cycle of main clutch 41, follower 83 will be rocked clockwise by cam 84 and then spring restored thereby reciprocating slide 82 in a forward and a return stroke. The forward stroke of slide 82 occurs during the initial dwell before the forward strokes of racks 18, and the return stroke of the slide occurs during the mid-cycle dwell before the return strokes of the racks.

Normally finger 81 is spring held counterclockwise with its front end below the end of the depending arm of lever 80 and therefore will pass idly beneath said depending arm during the forward stroke of slide 82. However, in response to depression of dividend entry key 16 or divisor entry key 17, program means (later described) operable by main clutch 41 prior to the forward stroke of slide 82 will rock a bail 85 counterclockwise to raise and hold the front end of finger 81 in position to engage the depending arm of lever 80 during the forward stroke of the slide. As a result, lever 80 will be rocked clockwise thereby moving rack arm 79 rearwardly and rotating pinion 78, shaft 71, and cams 70 counterclockwise to lower carriage 2 and engage selector gears 20 with the related racks 18.

Racks 18 will be arrested in their forward strokes when the respective selector gears 20 with which they are engaged are rotated counterclockwise to "0" registering position. For this purpose, each gear 20 is provided with a shoulder which engages a radially extending pin in shaft 66 to arrest rotation of the gear when it is rotated to "0" position.

During the mid-cycle dwell of racks 18, the printing mechanism will be operated. After the printing operation and before the racks are restored, cam 84 will permit follower 83 and the connected parts to be restored thereby raising carriage 2 and disengaging selector gears 20 from racks 18.

*The product-dividend register*

The product-dividend register 6 (FIGS. 1b, 9, 10, 13), as previously noted, comprises an ordinal series of twenty-one numeral wheels 25. Each numeral wheel 25 includes a wheel gear 25g which is engaged by an intermediate drive gear 87.

Register wheels 25 and intermediate gears 87 are rotatably mounted respectively on shafts 89 and 90 which are supported at their ends in a pair of end plates 91 (FIGS. 1b, 10). Suitable partition plates 92 separate and space wheels 25 and the associated parts and further support shafts 89, 90. Shafts 93, 94, 95 extend through end plates 91 and partition plates 92 thereby aligning and tying these plates together as a unit. The unit comprising plates 91, 92 and which includes product register 6 is mounted for vertical adjustment in the machine framing to engage and disengage register wheel gears 25g with rear racks 23.

Normally unit 91, 92 including wheels 25 is held raised with wheel gears 25g of wheels 25 above and disengaged from the respective racks 23. To this end, a pair of like cams 102 are fast on a shaft 100 adjacent the outer faces respectively of end plates 91. Each cam 102 is engaged by a pair of vertically spaced rollers 103 mounted on the associated end plate 91. Thus when shaft 100 and cams 102 are in normal clockwise position, unit 91, 92 including wheels 25 will be held raised, and when shaft 100 and cams 102 are rotated counterclockwise the unit will be lowered to engage wheel gears 25g with racks 23.

Means for rotating shaft 100 includes a pinion 104 (FIG. 14) fast on said shaft exteriorly of the right frame plate 97. Pinion 104 is engaged by a segmental rack 105r carried at the upper end of a vertically disposed lever 105. Lever 105 normally is spring held counterclockwise against a limit stop thereby holding pinion 104, shaft 100 and cams 102 clockwise, and register 6 raised with wheel gears 25g disengaged from racks 23.

The lower end of lever 105 is adapted for engagement by an interponent comprising a rearwardly extending hook arm 107 pivotally mounted at its front on previously described slide 82. Normally hook arm 107 is spring held clockwise with its hook end below the lower end of lever 105 and therefore will pass idly beneath said lever during the forward stroke of slide 82. However, in an operation to take a total (later described) from product-dividend register 6 to print a remainder, the aforenoted program means operable by main clutch 41 prior to the forward stroke of slide 82 will rock a bail 108 counterclockwise to raise and hold the rear end of hook arm 107 in position to engage the lower end of lever 105 during the forward stroke of the slide. As a result, lever 105 will be rocked clockwise to lower product-dividend register 6 to engage gears 25g of wheels 25 with racks 23 for the total taking operation.

Racks 23 and connected racks 18 will be arrested in their forward strokes when the respective wheels 25 are rotated counterclockwise to "0" registering position. After the printing operation and before the racks are restored, slide 82 will be restored, as previously described, and therefore register 6 will be raised to normal position.

Product-dividend register 6 is further controlled by lever 105 (FIG. 14) in a dividend entering operation. The lower end of lever 105 is adapted for engagement by an interponent comprising a rearwardly extending hook arm 300 pivotally mounted at its front on a slide 171 and similar to hook arm 107. Slide 171 is mounted for front and rear movement immediately inward of previously described slide 82 and has common mounting therewith.

The front end of slide 171 is pivotally connected to a depending arm of a cam follower 172 including a pair of legs engaging respectively positive action cams 173a, 173b fast on main drive shaft 42. Normally followers 172 and slide 171 are held by cams 173a, 173b in an intermediate position with the hook end of arm 300 immediately to the rear and below the lower end of lever 105. Upon each cycle of main clutch 41, follower 172 will be rocked clockwise, then counterclockwise beyond said intermediate position, and then clockwise to said intermediate position. Accordingly, slide 171 will be moved forwardly from said normal intermediate position, then rearwardly beyond said intermediate position, and then forwardly to said intermediate position.

The forward stroke of slide 171 occurs during the mid-cycle dwell after the forward strokes of racks 3 and before their return strokes. During the return strokes of racks 23, slide 171 will be held in forward stroke position; and then restored during a dwell at the end of the cycle.

Normally, hook arm 300 is spring held clockwise with its hook end below the lower end of lever 105 and therefore will pass idly beneath said lever during the forward stroke of slide 171. However, in an operation to enter a dividend (later described) into register 6, the aforenoted program means operable by main clutch 41 prior to the forward stroke of slide 171 will rock a bail 301 counterclockwise to raise and hold the rear end of hook arm 300 in position to engage the lower end of lever 105 during the forward stroke of the slide. As a result, lever 105 will be rocked clockwise thereby rotating pinion 104, shaft 100 and cams 102 counterclockwise to lower register 6 to engage gears 25g of wheels 25 with racks 23 during their return strokes to enter a dividend. During the terminal dwell in the cycle of racks 23, slide 171 will be restored, as previously described, and register 6 will be raised to normal position.

The return stroke of slide 171 beyond normal intermediate position provides for a conditioning operation in connection with a program of multiplication with which we are herein not concerned.

The rotary digital actuators

Rotary digital actuators 26 and 26c of actuator unit 7 (FIGS. 1b, 8, 9, 11, 12, 13, 15) are secured in spaced relationship on a sleeve 110 which is splined for shifting movement on a transverse shaft 111 and for rotation therewith. Shaft 111 is supported transversely of the machine by means for raising and lowering said shaft from a normal intermediate position, and is rotationally driven when in intermediate position by registration clutch 55 as later described.

Each digital actuator 26 includes a cylindrical body portion and nine settable teeth 26t correspnoding respectively to the digits "1"–"9". Teeth 26t are contained in radial circumferentially spaced slots 26s (FIGS. 9, 13) in the body portion of the actuator, and each is pivotally mounted at its inner end so that its projecting outer end may be moved to and from left and right vertical planes normal to the rotational axis of the actuator unit.

Actuator unit 7 is coupled to carriage 27 which is operable to shift said unit ordinally with respect to gears 87 of the product register as later described. Actuator unit 7 is normally in a right end ordinally shifted position (FIGS. 11, 12) wherein actuators 26, 26c from lowest to higher orders are operatively associated for additive registration with intermediate gears 87 respectively of product register 6 from lowest to higher orders. As later described, the actuator unit is adjustable a short step to the right from its normal position with respect to the carriage to provide for subtractive registration by complemental addition.

Figure 13:
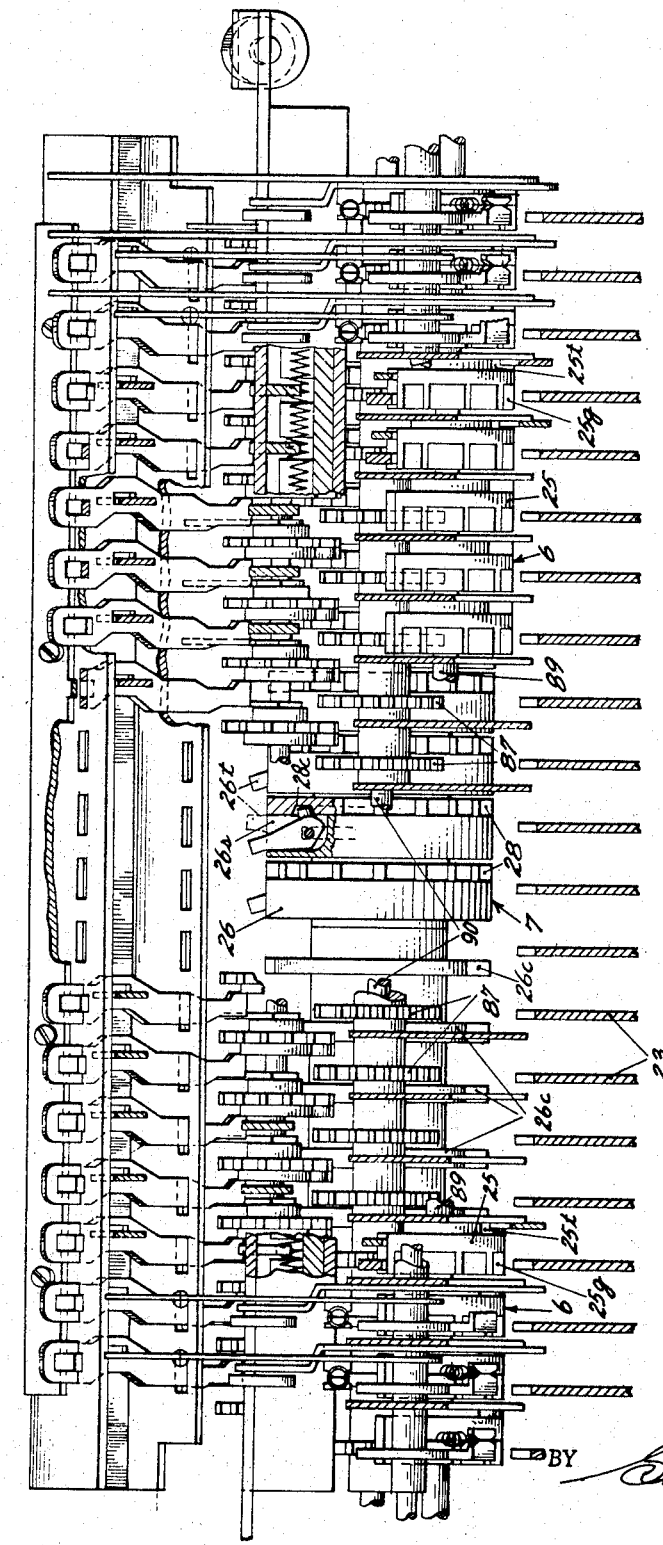
FIG. 13 is a front elevation of the rotary digital actuators and the dividend register with parts broken away.

When an actuator 26 is set for "0" registering operation, teeth 26t are in the aforenoted left vertical plane wherein they are a short distance to the left from the plane of the asociated intermediate gear 87 as shown in FIG. 13. When one or more of the nine teeth are set to the aforenoted right vertical plane, they are located in the plane of gear 87 and are therefore effective for additive registration, in accordance with the number of teeth set, by clockwise rotation (FIGS. 1b, 9) of the actuator unit. It will be noted that the number of teeth 26t remaining in the left plane is the nine's complement in all but the lowest order actuator which includes ten teeth; one of which is fixedly located in the left plane. This provides for the ten's complement in the units order which is necessary for subtractive registration of a number by addition of the complement.

To provide for subtractive registration by addition of the complement, actuator unit 7 is adjusted the aforenoted right step of movement with respect to carriage 27. This will bring teeth 26t comprising the complement into the planes of the respective associated gears 87. Furthermore, nine toothed complemental actuators 26c which are normally in planes to the left of the associated gears 87 will be moved into the planes of those gears.

Means for setting teeth 26t of each actuator 26 includes a setting gear 28 rotatable on sleeve 110 to the right of and engaging the left face of the actuator. Gear 28 is provided with an arcuate cam slot 28c (FIGS. 9, 13) in its face adjacent the actuator and this cam slot is engaged by projections which extend toward the right from the base of each tooth 26t.

Figure 12:
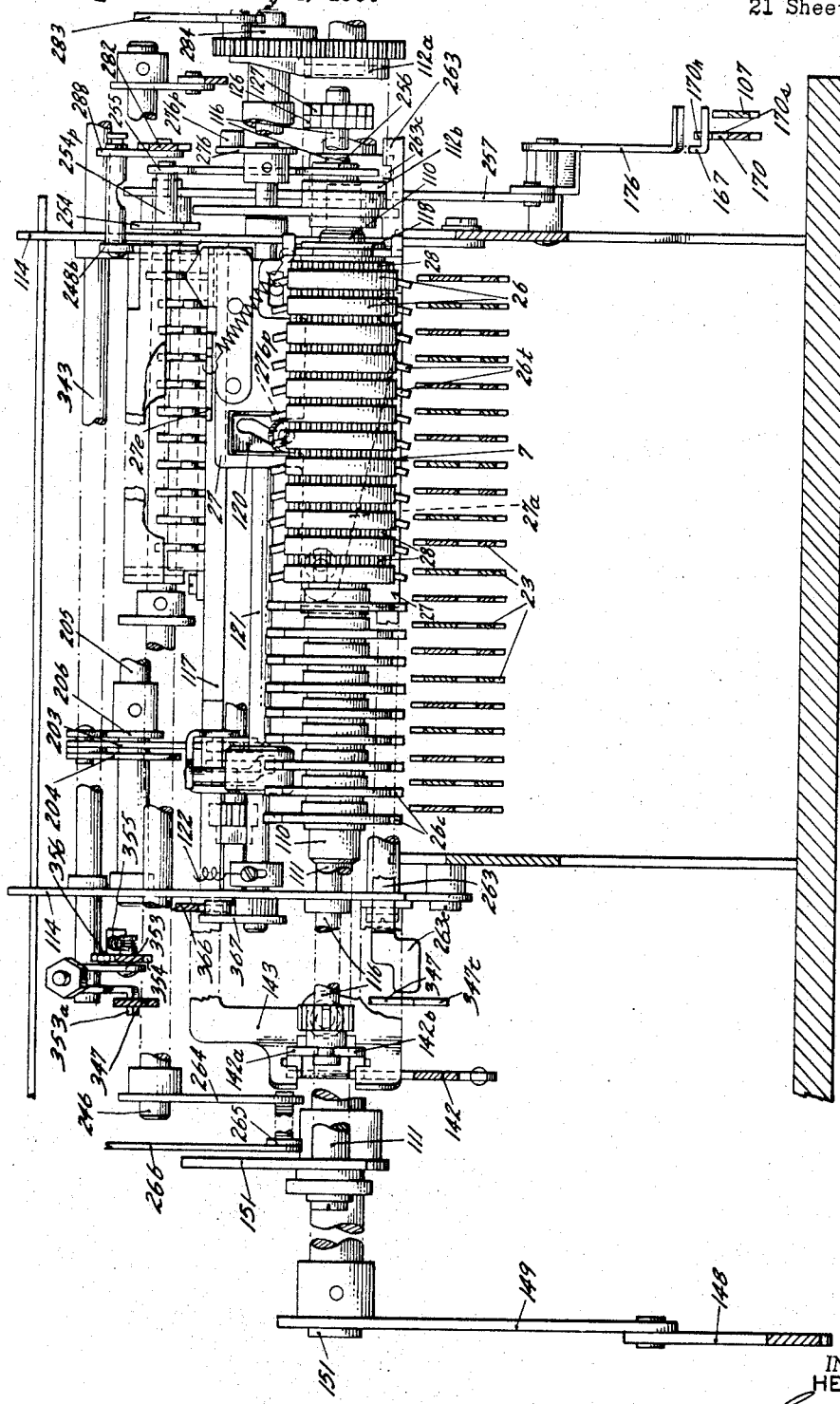
FIG. 12 is a front elevation of the rotary digital actuators and associated control devices.

When gear 28 is in normal counterclockwise position, teeth 26t will be held rocked by cam slot 28c with their ends in the plane to the left of the associated intermediate gear 87 as shown in FIGS. 12, 13. Upon clockwise movement of gear 28, teeth 26t will be rocked successively by cam slot 28c to the plane of gear 87. A spring pressed ball detent 29 in the body of the actutator engages a tooth space of gear 28 to hold it in adjusted position.

Teeth 26t of actuators 26 extend through an arc of somewhat less than 180°. This provides for an idle phase of operation at the beginning of each cycle before teeth 26t are rotated to engagement with intermediate gears 87, and for an idle phase at the end of the cycle after digital registration during which tens transfer mechanism 8 is effective. During the first idle phase, means, later described, is operable to effect the aforenoted adjustment of actuator unit 7 with respect to carriage 27 for complemental registration and vice versa. The invention is not concerned with the operation of the tens transfer mechanism as previously noted.

Means for unidirectionally driving actuator 7 by registration clutch 55 includes a coupling 112 (FIGS. 11, 12, 18) between the clutch and shaft 111 on which the unit is shiftably splined. Coupling 112 includes a driving member 112a fast on the output shaft of clutch 55 and a driven member 112b fast on shaft 111. Member 112a includes a diametral slot which is vertically disposed when clutch 55 is in full cycle position and member 112b includes a diametral tongue which engages said slot. Accordingly unit 7, while in the aforenoted intermediate position, is driven by clutch 55, and when the parts are at rest in full cycle position, the vertically disposed slot and tongue 112 will permit unit 7 to be raised for zeroizing actuators 26 and lowered to enter a value therein.

Figures 16, 17:
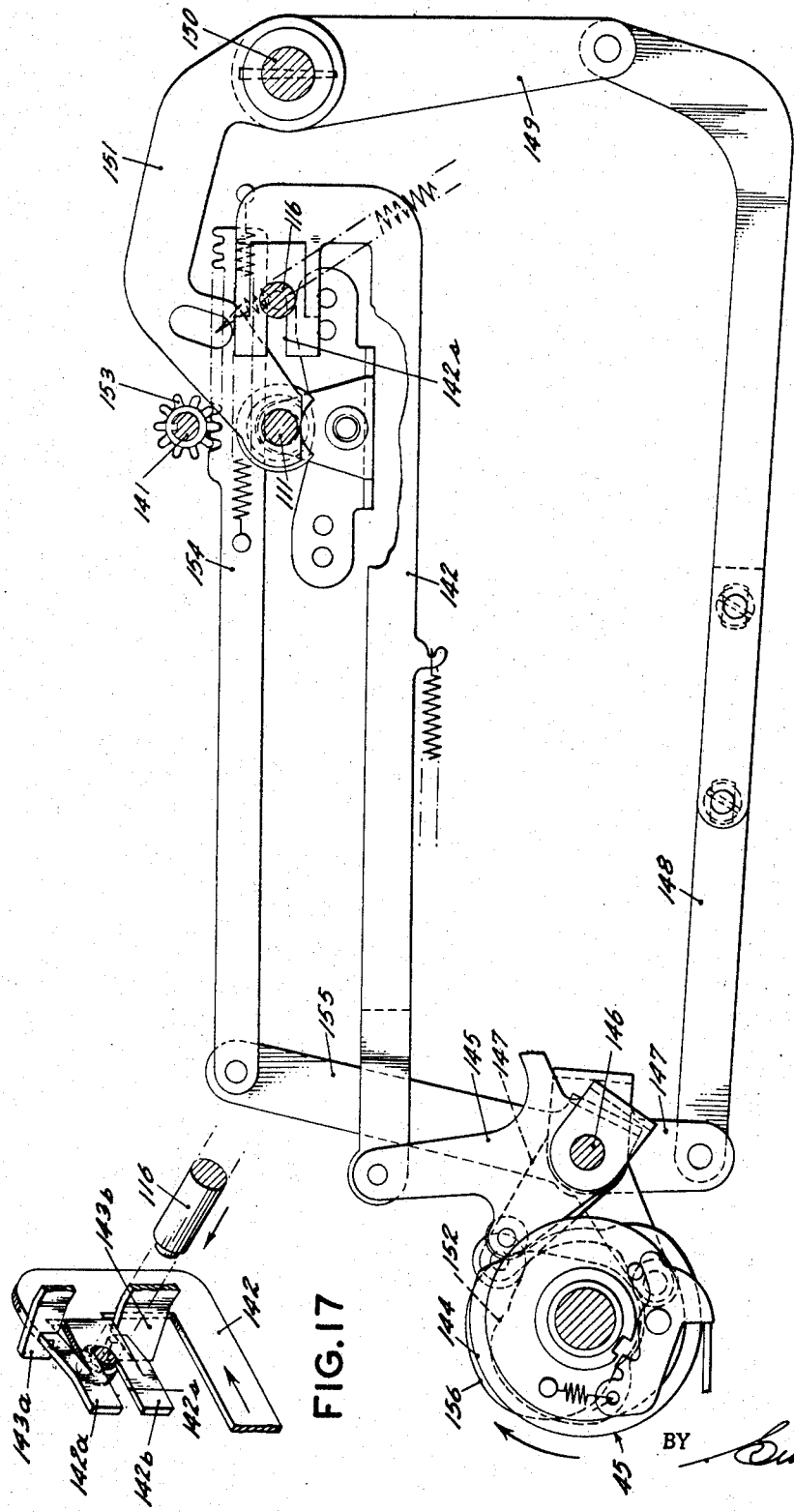
FIG. 16 is a detail side elevation of mechanism operable in clearing of the rotary digital actuators and entering a new value therein.
FIG. 17 is a fragmentary perspective of parts of FIG. 16.

During a cycle of main clutch 41 (FIG. 3), auxiliary clutch 45 (FIGS. 3A, 16) is operable in connection with means for clearing differentially settable digital actuators 26 of unit 7 and with means for entering a new value in said actuators. The clearing operation is effected by a series of pinions 140 associated respectively with setting gears 28 of actuators 26, and the value entering operation is effected by operation of actuator racks 23 under control of selector carriage 2.

The carriage for the rotary digital actuators

Carriage 27 (FIGS. 1b, 9, 11, 12) comprises a vertically disposed plate extending transversely of the machine and having rearwardly turned end portions by which said carriage is slidably supported for transverse shifting movement between a pair of left and right frame plates 114 on a transverse shaft 116 which is journaled in said plates. Furthermore, shaft 116 is longitudinally shiftable, as later described, a short step of movement toward the left from a normal position. Additonal means for slidable supporting carriage 27 comprises a transverse square shaft 117 secured at its end in plates 114 and engaged by an open end recess at the top of the right rear extension of the carriage.

Means for coupling actuator unit 7 for shifting movement with carriage 27 includes a plate 27a which is mounted on the front face of the carriage by slot and pin connections which permit said plate to be adjusted a short distance right and left on said carriage.

The right end of plate 27a has a forwardly turned end portion having a vertical front edge which engages a circumferential slot in a collar 118 fast on sleeve 110 adjacent the lowest order setting gear 28 of actuator unit 7. Accordingly actuator unit 7 is coupled to carriage 27 by plate 27a and collar 118.

Means normally operable to hold plate 27a and coupled actuator unit 7 in a left adjusted position with respect to carriage 27 includes a cylindrical cam 120 splined for shifting movement on a shaft 121 which is journaled in frame plates 114 to the rear of carriage 27. The front of cam 120 passes snugly through an opening in carriage 27 and therefore is shifted with the carriage. A pin 27p projecting rearwardly from an ear at the top edge of plate 27a engages a cam slot in cam 120. Normally shaft 121 and cam 120 splined thereon are held clockwise (FIG. 9) by a spring 122 with the cam slot engaging pin 27p operable to hold plate 27a in left adjusted position on carriage 27. Means, later described, is operable to rotate shaft 121 and cam 120 a counterclockwise step to move plate 27a to the aforenoted right adjusted position on carriage 27. This will adjust actuator unit 7 for complemental registration as previously described.

*Shifting means for the digital actuator carriage*

Means for ordinally shifting carriage 27 and actuator unit 7 comprises a worm gear 123 (FIGS. 9, 11) fast on shaft 116 and engaging a rack 27r secured at the lower rear of said carriage. Clockwise rotation of gear 123 will shift carriage 27 toward the left from right home position and counterclockwise rotation will restore said carriage. Each ordinal shift of carriage 27 is effected by a 60° rotation of gear 123 and detent means is operable to locate carriage 27 in any ordinal shifted position.

Means for rotating shaft 116 and worm 123 upon operation of shift clutch 53 (FIGS. 11, 18) includes a pair of ratchet wheels 126, 127 abutting one another and fast adjacent the right end of shaft 116. Each ratchet wheel has six teeth and wheel 126 is adapted to impart counterclockwise right shift rotation to shaft 116 whereas wheel 127 is adapted to impart clockwise left shift rotation.

A right shift pawl arm 128 and a left shift pawl arm 129 are adapted respectively to operate ratchet wheels 126, 127. Pawls 128, 129 have common pivotal mounting at the lower end of a lever 130 which is loosely mounted on a sleeve 131s which is rotatably mounted on a short shaft 131 fixed in the machining framing. An arm 132 is fast on sleeve 131s adjacent lever 130 and is connected at its upper end to the upper end of said lever. Lever 130 therefore is yieldably connected for rocking movement with arm 132 fast on sleeve 131s.

A lever 133 is fast on sleeve 131s inwardly of lever 130 and arm 132. A forwardly extending strap 134 is pivotally attached at its rear to arm 133, and at its front, the strap encircles an eccentric 135 fixed for rotation with the driven member of shift clutch 53. Therefore upon each cycle of clutch 53, strap 134 will be moved forwardly and restored thereby rocking arm 133, sleeve 131s, arm 132 and lever 130 in counterclockwise and return clockwise movement. This operation during each clutch cycle will reciprocate pawls 128, 129 toward the rear and then forwardly in an operating stroke.

The front operating end of pawl 128 is located above in the plane of ratchet wheel 126 and the front end of pawl 129 is below in the plane of wheel 127. Pawl 128, intermediate its ends engages an upper guide slot in a vertical slide 136 (FIGS. 18, 21–23) and pawl 129 engages a lower guide slot in said slide. A spring connects pawls 128, 129 and therefore pawl 128 is held counterclockwise in engagement with the bottom of its slot and pawl 129 is held clockwise in engagement with the top of its slot.

Normally slide 136, which is adapted to be adjusted to a raised or lowered position, is held in the lowered position by a toggle spring 136s. With slide 136 in lowered position, the operating end of pawl 128 will engage ratchet wheel 126 and the operating end of pawl 129 will be below and disengaged from wheel 127 (FIG. 18). Therefore in each clutch cycle during the rearward stroke of pawls 128, 129; pawl 128 will rack idly over a tooth of ratchet wheel 126 and on the forward stroke will engage said tooth and rotate said wheel 60° counterclockwise to effect one ordinal right shift operation. During this operation, pawl 129 will operate idly out of engagement with ratchet wheel 127.

With slide 136 in raised position where it is held by the above noted toggle spring 136s, the operating end of pawl 129 will engage ratchet wheel 127 and the operating end of pawl 128 will be above and disengaged from wheel 126. Therefore in each clutch cycle during the rearward stroke of pawls 128, 129; pawl 129 will rack idly over a tooth of wheel 127 and on the forward stroke will engage said tooth and rotate said wheel 60° clockwise to effect one ordinal left shift operation. During this operation pawl 128 will operate idly out of engagement with ratchet wheel 126.

*The multiplier-quotient register*

Multiplier-quotient register 9 (FIGS. 1b, 9, 11) as previously noted, comprises an ordinal series of eleven storage gears 30. Each gear includes ten teeth corresponding to the digits "0"–"9." The eleventh and highest order gear is operable only in multiplication, with which the present invention is not concerned, to receive a shortcut multiplier digit "1," whereas the other ten orders are alternatively operable to receive multiplier or quotient digits. The gears are located in the planes of and are normally disengaged above the ordinally corresponding lowest order racks 23. The ten lowest order racks are operable to take a total from the ten storage gears 30 which are operable to register a quotient.

Figure 15:
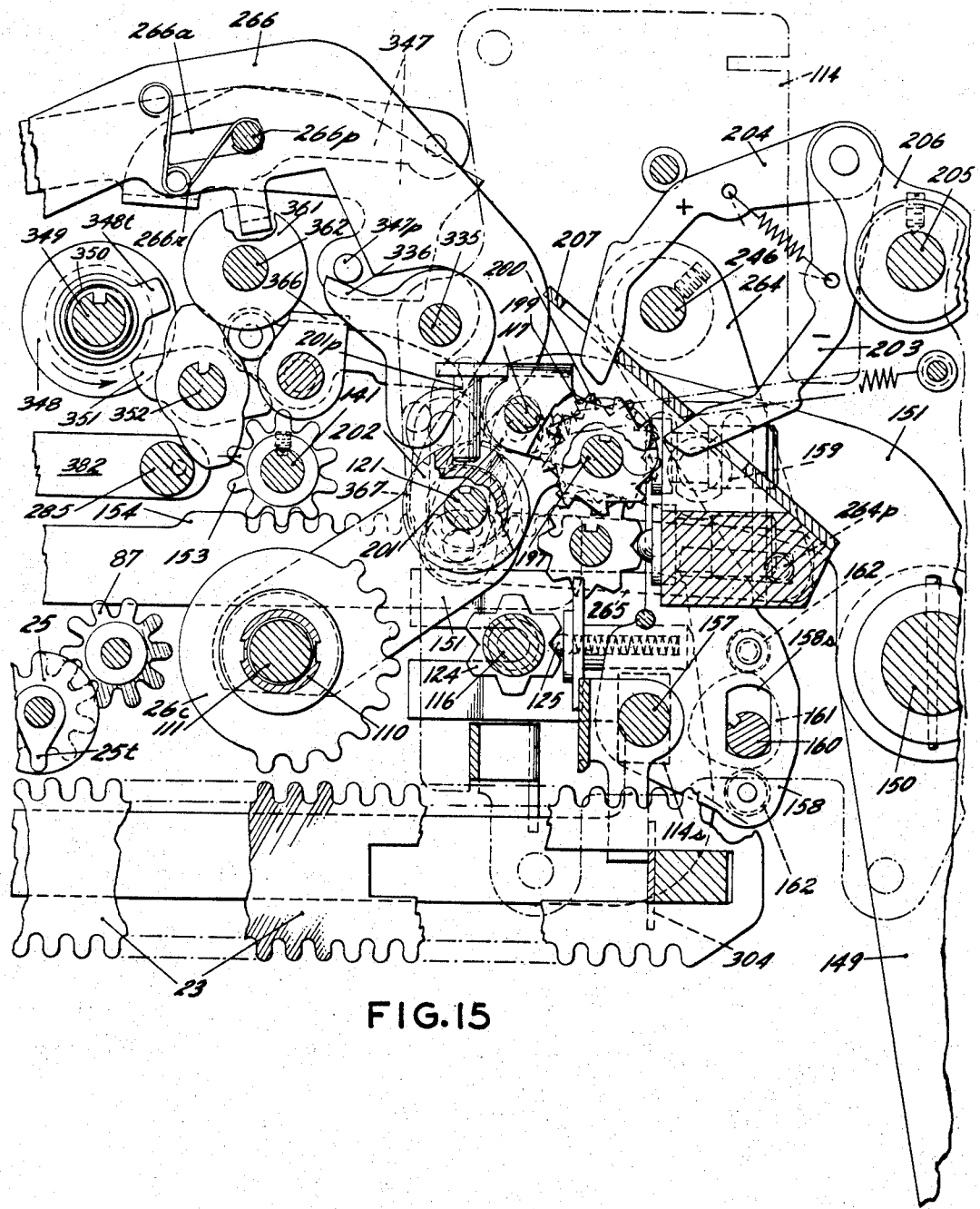
FIG. 15 is a vertical section showing the counting means for the quotient register and parts of the total taking control means.

Storage gears 30 are rotatably mounted on a shaft 157 which is supported at its ends in a pair of end plates 158 (FIG. 15). The register unit 9 comprising plates 158, shaft 157, and gears 30 is supported for vertical adjustment on the pair of right and left frame plates 114.

Vertical adjustment of register unit 9 is effected by a pair of like cams 161 mounted on shaft 160. One cam 161 is fast on shaft 160 adjacent the outer face of the left end plate 158 of the unit and the other cam 161 is fast on said shaft adjacent the outer face of the right end plate 158. A pair of vertically spaced rollers 162 on the outer face of each end plate 158 are engaged by the top and bottom of the related cam 161. When shaft 160 and cams 161 are in normal clockwise position, cams 161, operating on rollers 162, will hold unit 9 raised with multiplier storage gears 30 engaged with a corresponding series of intermediate gears 163 (FIGS. 1b, 9, 11) which are rotatably mounted on a shaft 164 supported at its ends in frame plates 114. Upon counterclockwise movement of shaft 160, cams 161, operating on rollers 162, will adjust unit 9 to a lowered position wherein gears 30 will be disengaged from intermediate gears 163 and engaged with actuator rack 23.

Means for rotating shaft 160 include a pinion 166 (FIG. 14) fast on said shaft to the right of right cam 161. Pinion 166 is engaged by a segmental rack 167r carried at the upper end of a vertically disposed lever 167. Lever 167 normally is spring held counterclockwise against a limit stop thereby holding pinion 166, shaft 160 and cams 161 clockwise, and register unit 9 raised with register gears 30 disengaged from racks 23 and engaged with intermediate gears 163.

The lower end of lever 167 is adapted for engagement by an interponent comprising a rearwardly extending hook arm 302 pivotally mounted at its front on previously described slide 82. Normally hook arm 302 is spring held clockwise with its hook end below the lower end of lever 167 and therefore will pass idly beneath said lever during the forward stroke of slide 82. However, in an operation to take a total (later described) from multiplier-quotient register 9, the aforenoted program means operable by main clutch 41 prior to the forward stroke of slide 82 will rock a bail 303 counterclockwise to raise and hold the rear end of hook arm 302 in position to engage the lower end of lever 167 during the forward stroke of the slide. As a result, lever 167 will be rocked clockwise thereby rotating pinion 166, shaft 160 and cams 161 counterclockwise to lower multiplier-quotient unit 9 to engage gears 30 with racks 23.

Racks 23 will be arrested in their forward strokes when the respective gears 30 are rotated counterclockwise to "0" registering position. For this purpose, each gear 30 is provided with a long tooth which engages a zero stop 304 (FIG. 15) when the gear is rotated to "0" position.

After the operation to print a quotient and before the racks are restored, slide 82 will be restored, as previously described, and therefore register 9 will be raised to normal position.

*The counting means for the multiplier quotient register*

Counting means is operable to register a quotient in storage gears 30 of multiplier-quotient register 9 from higher to lower orders. As previously noted, division is performed by the well-known subtract-add-shift method, and therefore the sign of registration in register 9 will be unlike the sign of registration in product-dividend register 6.

The counting means includes a counting gear 194 (FIGS. 9, 11) and an intermediate counting gear 195 driven by the counting gear. Gear 194 is splined for shifting on a transverse shaft 197 which is rotatably mounted in frame plates 114, and gear 195 is loosely mounted for shifting and rotation on a transverse shaft 198 which is also rotatably mounted in frame plates 114. Immediately to the left of intermediate gear 195 and splined for shifting on shaft 198 is a gear 196 which is used only in the shortcut multiplication program and with which the present invention is not concerned.

Gears 194, 195, 196 are trapped in a cage comprising the rearwardly extending right end of carriage 27 and a rearwardly extending plate 27c secured to the rear wall of the carriage. Accordingly, gears 194, 195, 196 will be shifted with carriage 27.

When carriage 27 is in rightmost shifted position, intermediate counting gear 195 will engage intermediate gear 163 of the lowest order multiplier-quotient register gear 30. Therefore as carriage 27 is shifted to the left to ordinally shift actuator unit 7 with respect to product-dividend register 6, intermediate counting gear 195 will be ordinally shifted to engage the successive higher order intermediate gears 163 of counter register 9. As later described, carriage 27 is shifted to the left to engage intermediate counting gear 195 with the tenth order intermediate register gear 163 prior to initiation of quotient registration. Provision therefore is made for the registration of a maximum of ten quotient digits from higher to lower orders.

Means for counting in a register gear 30 subtractively (counterclockwise) and additively (clockwise) includes respectively a pair of ratchet wheels 199, 200 (FIGS. 11, 15) shiftably splined as a unit on shaft 197 on which counting gear 194 is splined. The wheels are in spaced relationship with wheel 199 to the right of wheel 200 on common hub means.

Ratchet wheels 199, 200 are trapped in a cage 201 which is slidably mounted on shaft 117 forwardly of said wheels. Cage 201 includes a front projection on which is a depending pin 201p engaging a cam slot in a cylindrical cam 202 fast on shaft 121. It will be recalled that shaft 121 is normally spring held clockwise and splined thereon is cam 120 operable, upon counterclockwise movement of shaft 121, to adjust actuator unit 7 a step to the right with respect to carriage 27 to provide for complemental registration. Accordingly, upon counterclockwise movement of shaft 121, cam 202 will move cage 201 and wheels 199, 200 a step to the right to move wheel 199 from the plane of a counting finger 203 and wheel 200 into the plane of a counting finger 204.

Finger 203 operates through wheel 199 to rotate a gear 30 subtractively during additive operation of actuator unit 7, whereas finger 204 operates through wheel 200 to rotate a gear 30 additively during subtractive operation of actuator unit 7 by complemental addition. Fingers 203, 204 have common pivotal mounting at their rear at the end of an upstanding arm 206 fast on a transverse shaft 205 which is pivotally mounted adjacent its ends in frame plates 114. Fingers 203, 204 are spring urged one toward the other and extend forwardly through guide slots in a fixed plate 207 with finger 203 normally in the plane of ratchet wheel 199 and finger 204 in a plane between wheels 199, 200.

A depending arm 208 (FIG. 18) is fast adjacent the right end of shaft 205 and is connected by an eccentric strap 209 to an eccentric 210 driven by registration clutch 55. Therefore upon each cycle of clutch 55, shaft 205 will be rocked counterclockwise and restored thereby moving fingers 203, 204 in forward and return strokes.

With the parts in normal position, finger 203 in its forward stroke will engage a tooth of wheel 199 thereby rotating shaft 197 a step of movement clockwise. This step of movement will, through counting gear 194, intermediate gear 195 and an intermediate gear 163, step an entrained storage gear 30 one tooth space back toward "0." In this operation, finger 204 will be idly operated between wheels 199, 200.

When wheels 199, 200 are shifted to the right by cam 202 as previously described, wheel 199 will be removed from the plane of finger 203 and wheel 200 will be moved into the plane of finger 204. As a result, shaft 197 will be stepped counterclockwise by finger 204 when clutch 55 is cycled and the entrained storage gear 30 will be stepped forwardly to "0."

*Division (dividend entry)*

Figure 9:
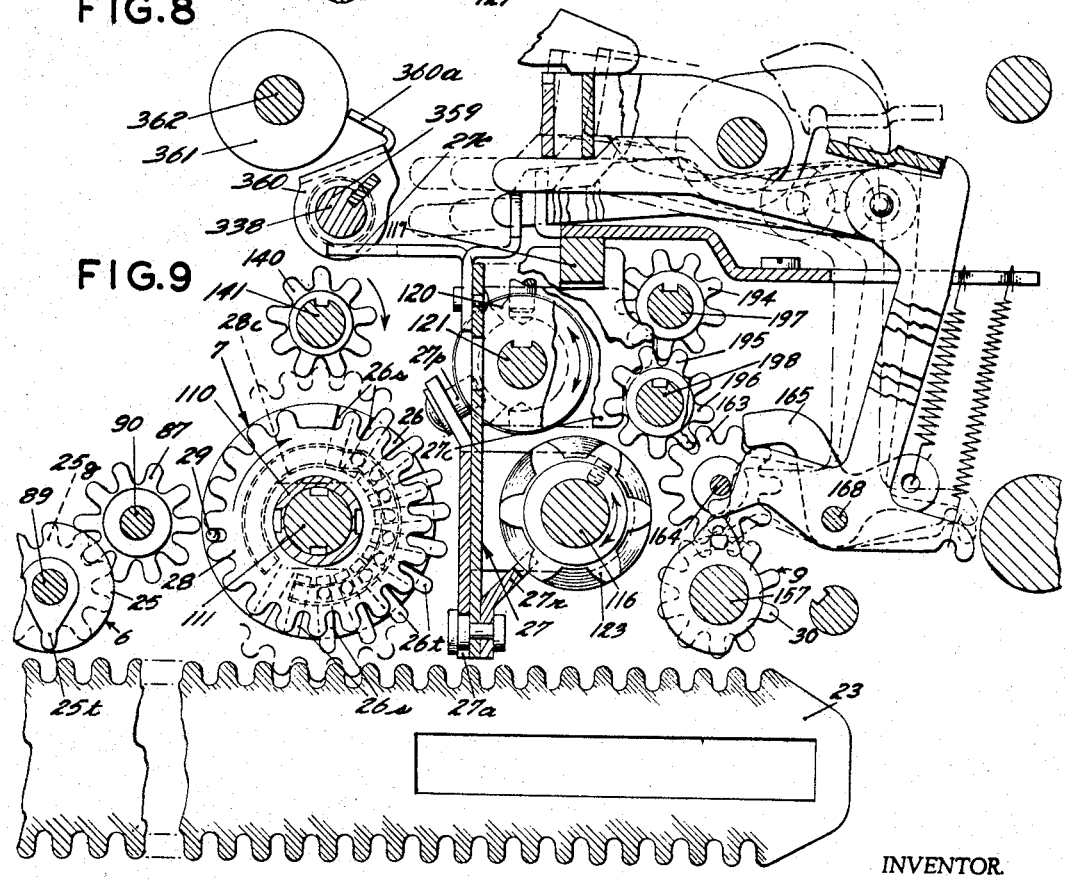
FIG. 9 is a vertical section of the mechanism of FIG. 8.

Dividend entry key 16 (FIGS. 2, 5, 14) will be depressed after depression of digit keys 1 to enter a dividend into selector carriage 2. Depression of key 16 will effect engagement of main clutch 41 (FIGS. 3, 24). A hold-up clutch lever 175, however, is operable to interrupt the operation of clutch 41 at 30° in the cycle. During this 30° operation, certain program control devices are set and means is operated to release hold-up lever 175 to permit clutch 41 to complete its cycle to enter the dividend into wheels 25 of product-dividend register 6 (FIGS. 1b, 9, 13).

The interruption of the operation of clutch 41 permits selector carriage 2 to be left shifted to an ordinal position determined by operation of decimal point mechanism before operation of the clutch to enter the value from the carriage to dividend register 6. The decimal point mechanism however may be disabled and in such instance the selector carriage will not be shifted during the 30° operation of clutch 41. With the decimal point mechanism disabled, clutch lever 175 will be disabled during the 30° operation of the clutch which will accordingly complete its cycle without interruption. The above and other operations referred to and not described in detail herein are fully disclosed in applicant's aforenoted application S.N. 222,144 to which reference is made.

Depression of any one of the function keys 14–17 (FIGS. 2, 5) is operable to engage main clutch 41 (FIG. 3). Accordingly, depression of dividend entry key 16 operates to move a link 178 rearwardly. Link 178, at its rear has yieldable slot and pin connection with a link 179 which is normally spring held rearwardly with respect to link 178 to the limit of the slot and pin connection. Link 179 extends rearwardly and is there connected to the aforenoted clutch lever 43. A spring 181 attached to link 178 normally holds links 178, 179 forwardly and clutch lever 42 counterclockwise in engagement with pawl 41p to disengage clutch 41. Therefore rearward movement of link 178, upon depression of key 16, will rock clutch lever 43 clockwise to engage the clutch. In the above operation, means is operable to latch key 16 depressed and the clutch engaging parts in operated position.

Clutch lever 175 for interrupting operation of clutch 41 after 30° of operation is fast on a shaft 177 fulcrumed in the machine framing and includes a rearwardly extending arm having a bent over end normally in the path of clutch pawl 41p to disengage said clutch. Means for controlling lever 175 includes a cam follower comprising a lever 183 having common fulcrum with lever 175. Follower 183 comprises a depending arm having a roller at its end normally engaging the high part of a cam 184 shown in dotted lines (FIG. 3) and which has a low part immediately clockwise from the roller. Spring means holds clutch lever 175 counterclockwise with respect to follower 183 in engagement with a limit stop comprising a pin in the follower. Accordingly, when follower 183 engages the high part of cam 184, clutch lever 175 will be held counterclockwise to clutch disengaging position in the path of clutch pawl 41p.

When the driven member of clutch 41 moves between full cycle position and the 30° step of rotation, the low part of cam 184 will be brought into registration with the roller of follower 183. Follower 183 will now be free for clockwise movement to thereby rock clutch lever 175 clockwise from the path of pawl 41p to permit clutch 41 to complete its cycle without interruption, or to release pawl lip 41p to reengage the clutch after interruption. The first of the above operations of clutch lever 175 will be effected if the decimal system is disabled and the second if the system is enabled Main clutch 41, during the above noted 30° of operation in response to depression of dividend entry key 16, operates means for performing the following operations. Bail 85 (FIG. 14) will be raised thereby raising finger 81 in position to engage and rock lever 80 when slide 82 is reciprocated in a machine cycle. This will engage selector gears 20 of carriage 2 with racks 18 to control the excursions of racks 18, 23 in a machine cycle as previously described. Bail 301 (FIGS. 14, 26) will be raised thereby raising finger 300 in position to engage and rock lever 105 when slide 171 is reciprocated in a machine cycle. This will engage wheel gears 25g of product-dividend register 6 with racks 23 to enter the dividend in selector carriage 2 into wheels 25 as previously described. Furthermore, follower 183 (FIG. 3) will be operated to disable hold-up clutch lever 175 to provide for completion of the cycle of main clutch 41 as described.

The means operated by main clutch 41 during its first 30° of operation includes a common drive member comprising a power slide 185 (FIGS. 3A, 14) which is reciprocated once for each cycle of the clutch. Slide 185 extends transversely of the machine below the rear of the keyboard in a vertically disposed position, and is adapted for transverse reciprocation by pin and slot mounting on the machine framing. Normally power slide 185 is held toward the right. Early in a cycle of clutch 41, slide 185 will be driven toward the left. The slide then will dwell until near the end of the clutch cycle when it will be restored.

Means operable by power slide 185 is adjusted into driven relationship with said slide upon depression of dividend entry key 16. Depression of key 16 is operable to adjust a selection shaft 305 (FIG. 14) rearwardly. Shaft 305 is provided with a blade 306 and is normally spring held forwardly and counterclockwise.

Upon depression of key 16, shaft 305 will be moved rearwardly to engage the rear of blade 306 with a tooth of power slide 185 and into operating relationship with slides 186, 191, and 307 (FIG. 26). Therefore during the 30° operation of main clutch 41, these slides will be moved to the left and restored near the end of the clutch cycle.

Leftward movement of slide 186 will rock a bell crank 187 thereby moving arm 188 (FIGS. 6, 26) rearwardly. Rearward movement of arm 188 will cause operation of a transmission train extending across the machine to follower 183 (FIG. 3) which will be rocked clockwise to likewise rock hold-up clutch lever 175 clockwise to disabled position so that main clutch 41 will complete the dividend entering cycle.

Leftward movement of slide 191 will rock a bell crank 192 clockwise thereby moving a slide 193 forwardly. Forward movement of slide 193 will bring cam surface 193c into engagement with bail 85 thereby raising said bail, and finger 81 into operating position with respect to lever 80.

Leftward movement of slide 307 will rock a bell crank 308 clockwise thereby moving a slide 309 forwardly. Forward movement of slide 309 will bring a cam surface 309c into engagement with bail 301 thereby raising said bail, and hook arm 300 into operating position with respect to lever 105.

With the parts adjusted as described above during the 30° operation of main clutch 41, operation of the clutch in completing the cycle will operate the parts to enter a dividend in register 6 as previously described. At the end of the cycle, clutch 41 will be disengaged, key 16 will be released, and the adjusted parts normalized.

Division (divisor entry)

After entry and printing of a dividend, digit keys 1 are depressed to enter a divisor into selector carriage 2, and then divisor entry key 17 (FIGS. 2, 5, 14) is depressed. As previously noted, key 17 will rock clutch lever 43 to engage main clutch 41 and the key will be latched depressed.

Power slide 185 (FIGS. 3A, 14) as previously described, is moved to the left during the first 30° operation of clutch 41, and is restored near the end of the clutch cycle.

Normally disabled means enabled upon depression of key 17 is operable to step a program shaft 310 (FIG. 26) a 60° turn during leftward movement of power slide 185 and another 60° in the same direction when the slide is restored.

The previously described program slide 186 and program slides 226, 227, 233, 311, 312, 313, and 314 are controlled by cams 320, 322, 323, 324, 325, 326, 327, and 328 respectively on program shaft 310 and engaging lugs on the slides. Spring means normally holds the slides in unset position with their lugs engaging their respective cams. Slide 191 moves with slide 186 as previously described and is therefore also controlled by cam 320.

During the first 30° operation of main clutch 41, program shaft 310 will be given a first 60° step of rotation. In this operation, slides 186, 191, 233, and 311 will be moved and held to the left by their respective cams.

Leftward movement of slides 186, 191, as previously described, provides for completion of the cycle of main clutch 41 with the excursions of actuator racks 18, 23 controlled in accordance with the values entered in selector carriage 2.

Slide 311 when in left adjusted position will control engagement of auxiliary clutch 45 (FIGS. 3A, 16) for simultaneous operation with main clutch 41. This will control actuator unit 7 for clearing of digital actuators 26 followed by entry of a divisor value therein and printing in accordance with the excursions of the related racks 23 as described.

Slide 233 when in left adjusted position controls means for preventing movement of clutch lever 43 to position to disengage clutch 41 at the end of the cycle. Therefore clutch 41 will continue 30° into the next cycle where it will be arrested by hold-up clutch lever 175. This cycle is for printing the quotient and the operation of clutch 41 will be held in abeyance until after quotient registration.

Near the end of the above described divisor entering and printing cycle of main clutch 41, power slide 185 will be restored thereby rotating program shaft 310 a second 60° step and in the 30° step of main clutch 41 in the quotient printing cycle, power slide 185 will be moved to the left to give program shaft 310 a third 60° step. During the above noted second and third steps of program shaft 310, control devices operable in quotient registration are set and quotient registration is initiated as described in the following section.

Division (setting operations)

In the second step of program shaft 310 (FIG. 26), cams 320, 325 will permit slides 186, 191, 311 to be restored to the right by their spring means. Slide 233 however will remain in its left set position. Furthermore, slide 312 will be moved and held to the right by cam 326.

Slide 233 when in left set position, as previously noted, controls means for preventing movement of clutch lever 43 (FIG. 3) to position to disengage main clutch 41 at the end of a cycle.

Slide 312 in movement toward the right will rock a bell crank 330 counterclockwise thereby moving a link 331 forwardly and a vertically disposed lever 332 (FIG. 27) clockwise. A push link 333 is pivotally attached at its front to the upper end of lever 332 and extends rearwardly adjacent the machine left side frame where it is supported at its rear by suitable pin and slot mounting.

An upstanding crank 334 is fast on a transverse shaft 355 (FIGS. 11, 12, 19, 27, 28) journaled in the machine framing and has a pin 335p which is engaged by a shoulder at the rear underedge of link 333. Therefore upon clockwise movement of lever 332, link 333 will be moved rearwardly and crank 334 and shaft 335 will be rocked clockwise. A crank 336 is fast on shaft 335 to the right of crank 334 and has pin and slot connection with a crank 337 fast on a shaft 338 journaled in the machine framing. Crank 336 will therefore be rocked clockwise with shaft 335 and crank 337, and shaft 338 will be rocked counterclockwise.

Shaft 338 extends across the machine and fast adjacent to the right end of the shaft is an upstanding cam crank 339 (FIGS. 18, 22, 23). Crank 339 is provided at its end with an arcuate recess in which a pin 340p normally is seated. Pin 340p is mounted at the front end of a rearwardly extending lever 340 which at its rear is pivotally attached to the upper end of a vertically disposed control slide 341 which is spring urged upwardly. When shaft 338 is rocked counter-clockwise, cam crank 339 will be rocked likewise to remove the seat at its end from engagement with pin 340p. This will release lever 340 and slide 341 which will be raised as the lever is rocked counterclockwise and pin 340p follows a cam edge to a lower seat at the right side of crank 339. When slide 341 is raised it will be brought into controlling position with respect to a number of devices as follows.

Normally carriage 27 for digital actuator unit 7 is in rightmost shifted position. Before quotient registration is initiated, carriage 27 wll be shifted to its leftmost position. Thereafter the carriage will be shifted toward the right to align the divisor with the successive lower orders of the dividend during quotient registration. Slide 341 when raised will control operaton of direction control means for the shifting mechanism of carriage 27.

The shift direction control means for carriage 27 includes vertically adjustable slide 136 (FIGS. 18, 21–23) which, as previously described, is normally in lowered position thereby enabling pawl arm 128 which is operable upon each cycle of clutch 53 to shift carriage 27 one ordinal position to the right. However, slide 136 must be adjusted to raised position to enable pawl 129 for left shift of carriage 27 to its left end position prior to initiation of quotient registration as previously noted.

Slide 136 is positioned edgewise transversely of the machine and has vertical opened end slots at its upper and lower ends. Pin means in a bracket engages the upper slot, and a lug of another bracket engages the lower slot. Slide 136 is thereby mounted for vertical adjustment and is limited in vertical movement by the ends of the slots engaging the mounting means. Toggle spring 136s holds slide 136 in raised or in the normal lowered right shift control position shown in the drawings.

The means for vertically adjusting slide 136 includes a shuttle 260 having a cylindrical part mounted for front and rear reciprocatory movement and for rotation in a bracket 261 inwardly and rearwardly of slide 136. Means for reciprocating shuttle 260 includes a lever 262 fulcrumed in the machine framing and having a lower forked end engaging a spool fast on said shuttle. Lever 262 extends upwardly and has common pivotal connection at its upper end with the connection of eccentric strap 134 with crank arm 133. Therefore upon each cycle of shift clutch 53, shuttle 260 will be reciprocated first toward the rear of the machine and then forwardly to the normal position shown in the drawings.

Shuttle 260 extends forwardly of slide 136 and inwardly of the inner edge thereof. The forward part of shuttle 260 comprises a right shift cam finger 260a and a diametrically opposed left shift cam finger 260b. Cam fingers 260a, 260b include opposed cam edges which flare radially outward from the cylindrical part of the shuttle toward the front of the machine from a position normally immediately in front of slide 136 (FIGS. 18, 22).

A pair of vertically spaced right and left shift lugs 136a, 136b extend inwardly from slide 136 respectively below and above the cylindrical part of shuttle 260 immediately to the rear of the cam edges of fingers 260a, 260b when said shuttle is in normal forward position. Shuttle 260 is urged counterclockwise (FIG. 21) clockwise (FIG. 23) to the dotted line right shift position by a spring 260s but is normally restrained in full line left shift position by a slide 263 later described. Furthermore, slide 136 is normally in lowered right shift position wherein right shift pawl arm 128 (FIG. 18) is enabled. The above are the normal relative positions of slide 136 and shuttle 260 wherein carriage 27 is in right home position. With the parts in these positions the operation upon cycling of shift clutch 53 is as follows.

Left shift lug 136b will be in the path of the cam edge of left shift finger 260b when shuttle 260 is reciprocated rearwardly during the first half cycle of shift clutch 53 whereas right shift lug 136a will be out of the path of finger 260a. As a result, finger 260b will engage lug 136b thereby camming slide 136 upwardly to enable left shift pawl arm 129 and to disable right shift pawl arm 128. It will be recalled that the enabled pawl arm 128 or 129 is effective during the last half cycle of clutch 53. Therefore as long as shuttle 260 is held in left shift position against the urge of spring 260s, left shift pawl arm 129 will be effective upon operation of clutch 53.

Means operable to hold shuttle 260 in left shift position against the urge of spring 260s when carriage 27 is in normal right end position comprises the previously noted slide 263 (FIGS. 21–23) which is mounted transversely of the machine in suitable guide slots in frame plates 114. Slide 263 extends outwardly from the right frame plate 114 and is there provided with a rearwardly turned ear 263a which engages the inner side of finger 260b of shuttle 260. Inwardly of right frame plate 114, slide 163 has an upstanding lug 263b which is engaged by the right end of carriage 27 when said carriage is in right end position to hold slide 263 toward the right and shuttle 260 to left shift position against the urge of spring 260s.

Obviously during the first ordinal left shift of carriage 27 upon engagement of shift clutch 53 (later described) to initiate the program of division, the carriage will be moved from engagement with lug 263b and slide 263 will release shuttle 260. Means therefore is provided to supersede the operation of slide 263 and hold shuttle 260 in left shift position until carriage 27 is shifted to its left end position.

The superseding means for slide 263 comprises a lug 341a on slide 341 which is raised, as previously described by means operable during the second step of program shaft 310. Lug 341a extends to the left from slide 341 adjacent its lower end and is normally located below finger 260a of shuttle 260. When slide 341 is raised, lug 341a will be engaged with the right side of finger 260a thereby holding shuttle 260 in left shift position against the urge of spring 260s until carriage 27 is shifted to left end position as later described.

Another operation is performed by a leftwardly extending lug 341b on slide 341 to hold in abeyance the operation of a push-pull registration and shift control ram 345 which is alternatively operable to engage shift clutch 53 and registration clutch 55.

Ram 345 has pivotal mounting at its rear at the end of a depending crank 346 fast on the right end of a transverse shaft 343 journaled in the machine framing. Ram 345 extends forwardly and terminates at its upper side in a nose 345n and at its lower side in an upwardly turned hook 345h. Suitable pin and slot mounting between nose 345n and hook 345h slidably supports the ram adjacent its front.

When ram 345 is in a normal intermediate position, nose 345n lies immediately to the rear of a boss 54a on clutch lever 54 of shift clutch 53 and hook 345h lies immediately in front of a roller 56r on clutch lever 56 of registration clutch 55. With the parts in this position, both clutch levers 54, 56 will be in clutch disengaging position. Means, later described, rocks crank 346 clockwise or alternatively counterclockwise. Clockwise movement of crank 346 will move ram 345 forwardly thereby engaging nose 345n with boss 54a to rock clutch lever 54 to engage shift clutch 53, whereas counterclockwise movement of the crank will move ram 345 rearwardly to engage hook 345h with roller 56r to rock clutch lever 56 to engage registration clutch 55.

When slide 341 is raised, lug 341b will be moved to a position immediately to the rear of a shoulder 345s at the underedge of ram 345. As later described, crank 346 will be spring loaded to move ram 345 rearwardly to engage registration clutch 55. However this operation is held in abeyance until carriage 27 is shifted to left end position.

Slide 341 performs another operation with respect to a pair of scissor levers 273, 274 (later described). Slide 341 includes a forwardly extending ear adjacent its lower end on which is a stud 341c. Stud 341c is normally positioned between upstanding opposed arms of scissors 273, 274. However, when slide 341 is raised, stud 341c will be moved from between to a position above the arms of the scissors and is adapted to operate with respect to a cam surface 273c at the end of the arm of scissor 273 as later described.

Setting operations other than those described above are performed in the second step of program shaft 310 (FIG. 26) and the clockwise movement of shaft 335 and crank 336 (FIGS. 19, 28). Furthermore, ram 345 will be operated to engage clutch 53 for left shift operation.

A crank 344 is fast on shaft 335 to the left of crank 336 and engages the underside of a pin 347p on the rear arm of a lever 347 which is spring urged clockwise. Lever 347 includes a cam nose 347c at its front, a stop lug 347s at its rear, and depending tail 347t at its rear. Clockwise movement of shaft 335 will likewise rock crank 344 which by engagement with pin 347p will rock lever 347 counterclockwise.

Cam nose 347c engages the left inclined face of a disc 348 which includes a driving tooth 348t and which is splined for axial adjustment the left end of a shaft 349 which extends across the machine and is driven directly by the driven member of shift clutch 53. Normally disc 348 is held to the left in a disabled position by a spring 350 and upon each cycle of shift clutch 53, tooth 348t will be idly operable with respect to program means including a cam wheel 351 (FIGS. 30, 31) fast on a program shaft 352 later described. However, when lever 347 is rocked counterclockwise, cam nose, 347c will move disc 348 to the right so that cam wheel 351 will be in the path of tooth 348t.

Pin 347p of lever 347 performs a setting operation to condition means operable at the conclusion of quotient registration to trip hold-up clutch 175 (FIGS. 3, 24) to reengage main clutch 41 for the total taking operation to print the quotient.

The tripping means for hold-up clutch lever 175 includes a forwardly extending slide 266 (FIGS. 15, 24) which is supported adjacent its front end in a guide slot 267s of a bracket 267. Slide 266 is supported adjacent its rear by a fixed pin 266p which engages a slot 266a in said slide, and a spring 266s normally holds link 266 forwardly to the limit afforded by the rear of slot 266a engaging pin 266p. The rear end of slide 266 has pivotal attachment to the front of a link 265 which is movable with the slide and with which the invention is not concerned.

A finger 268 is pivotally mounted at its rear intermediate the end of slide 266 and extends forwardly where it has common support with slide 266 in guide slot 267s of bracket 267. A spring 268s urges finger 268 counterclockwise (FIG. 24) to hold its front end in engagement with the bottom of slot 267s. A shoulder 268a in the lower edge of finger 268 is normally immediately in front of slot 267s and the front end of said finger is in a position slightly above and forwardly of the rear edge of an upstanding lug 269a of an arm 269 which is fast on shaft 177 on which hold-up clutch lever 175 is fast. Arm 269 extends rearwardly and terminates in a lug 269b, and normally in front and slightly above lug 269b is a depending lug 266b of slide 266.

When crank 347 is rocked counterclockwise, pin 347p will, by engagement with cam edge 266c of slide 266, cam said slide and finger 268 rearwardly. This will engage the underside of lug 266b with the top of lug 269b thereby preventing hold-up clutch lever 175 of main clutch 41 from moving from clutch disengaging position by vibration or the like during product registration. Furthermore, shoulder 268a of finger 268 will be moved a distance to the rear of slot 267s of bracket 267, and the front end of said finger will be moved to the rear of lug 269a of arm 269. As a result, spring 268s will rock finger 268 counterclockwise to thereby drop the front end of said finger into the plane of lug 269a of arm 269.

When quotient registration is terminated, as later described, slide 266 will be released for operation by spring 266s. Slide 266 and finger 268 will be moved forwardly to disengage lugs 266b, 269b and to engage the end of said finger with lug 269a. Therefore arm 269 and hold-up clutch lever 175 will be rocked to clutch engaging position and clutch 41 will be reengaged to complete its cycle for printing the total. In this operation, slide 266 and finger 268 will be arrested in forward movement by shoulder 268a engaging bracket 267 below slot 267s. As clutch 41 continues in its cycle, the high part of cam 221 (FIG. 3) will engage the end of clutch lever 175 to rock said lever and arm 269 further in clutch engaging direction. This movement will engage lug 269b with the underedge of finger 268 thereby raising shoulder 268a above the bottom of slot 267s of bracket 267, and raising the end of said finger above lug 269a of arm 269. Then spring 266s will move slide 266 and finger 268 further forward to normal position.

Stop lug 347s (FIGS. 19, 28) controls means for operating ram 345 (FIG. 18) to engage clutch 53 for left shift operation. Such means includes a depending crank 353 (FIGS. 28, 31) fast adjacent the left end of shaft 343 on which the driving crank 346 of ram 345 is also fast. A pin 353p at the end of crank 353 engages a longitudinal slot 354s intermediate the ends of a horizontally disposed push-pull link 354. A spring 355 between pin 353p and the rear end of link 354 normally holds the link forwardly with the pin engaging the rear of slot 354s. A spring 356 urges link 354 forwardly and therefore urges crank 353 clockwise. Crank 353, however, is normally restrained in an intermediate position from such movement by stop lug 347s which is engaged by a lug 353a at the end of a depending arm which is integral with crank 353.

The front end of link 354 is pivotally connected to a cam follower 357 (FIG. 31) having a roller 357r adapted for engagement with a cam wheel 358 fast on the aforenoted program shaft 352. When crank 353 and link 354 are in normal intermediate position, roller 357r is a step of movement from the low part of cam wheel 358.

When a lever 347 is rocked counterclockwise, stop lug 347s will be moved from engagement with lug 353a thereby releasing crank 353. Spring 356 therefore will move link 354 forwardly to engage roller 357r with the low part of cam wheel 358 and rock crank 353, shaft 343, and crank 346 (FIG. 18) clockwise. Accordingly ram 345 will be moved forwardly to engage shift clutch 53.

Shuttle 260, upon operation of clutch 53 as previously described, will raise slide 136 to change the shifting mechanism, before it is effective, from right to left shift operation. Carriage 27 therefore will be shifted toward the left. During the initial left shift movement of carriage 27, slide 263 will be released and spring moved to the left, ear 263a will release shuttle 260 which, however, will remain held in left shift position by lug 341a of slide 341 as previously described.

A lug 263e (FIG. 19) at the left end of slide 263 is operable to latch lever 347 counterclockwise; and therefore the parts adjusted by the lever will be held in operated position until carriage 27 is restored to right end position as later described upon termination of the division program. When slide 263 is held to the right in normal position by carriage 27, lug 263e will be to the right of tail 347t of lever 347, and the end of the tail will be forwardly of the lug as shown by the full line position of FIG. 19. When lever 347 is rocked counterclockwise, tail 347t will be moved rearwardly to a plane immediately to the rear of lug 263e as shown by the dot-dash position. As a result, when slide 263 is released by carriage 27 and is moved to the left, lug 263e will be moved in front of tail 347t thereby restraining lever 347 from being restored clockwise when it is released by crank 344 as later described.

Means is provided to restore shaft 338 and the entrained parts and to initiate quotient registration when carriage 27 moves into its leftmost position. Such means comprise a cam plate 360a fixed on a yoke 360 (FIGS. 19, 20) which is splined for axial movement on shaft 338 and is held to the right by a spring 359. Cam plate 360 is provided with a left cam edge which is normally clockwise and immediately to the right of cam disk 361 which is fixed against axial movement on a shaft 362. A forwardly extending plate 27e at the top of carriage 27 will engage yoke 360 and move it to the left when carriage 27 is shifted into its left end position and the parts will be operated as later described.

It will be recalled that main clutch 41 is not disengaged at the end of the divisor entering cycle, but continues 30° into the next or quotient taking cycle where it is arrested by hold up clutch lever 175. In the 30° step of clutch 41 for the quotient taking cycle, program shaft 310 (FIG. 26) will be given a third 60° step of rotation.

In the third step of program shaft 310, cam 326 will release slide 312 so that it and the entrained parts may be restored as later described. Slide 233 however will remain in left set position. Furthermore, slides 227 and 313 will be moved and held to the left by cams 323 and 327.

Slide 233 when in left set position, as previously noted, controls means for preventing movement of clutch lever 43 to position to disengage main clutch 41 at the end of the cycle. Therefore provision is made for a cycle of clutch 41 to print a remainder after the quotient printing cycle.

Figure 14:
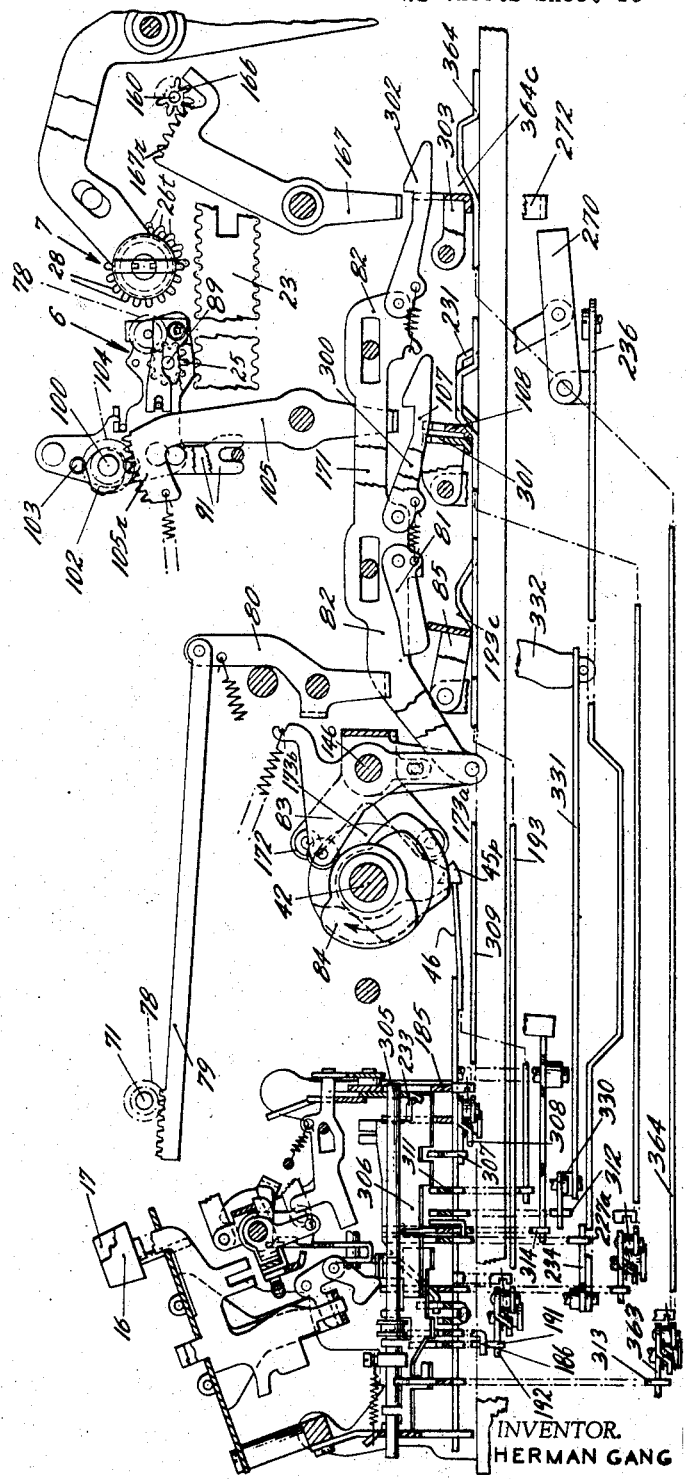
FIG. 14 is a right side elevation of mechanism operable in dividend and divisor entering operations, and in operations for taking totals of a quotient and a remainder.

Slide 313 has an upstanding lug which engages one arm of a bell crank 363 the other arm of which is pivotally connected to the front end of a rearwardly extending slide 364. Bell crank 363 is spring biased counterclockwise normally holding slide 313 to the right and slide 364 to the rear with a cam surface 364c immediately to the rear of the aforenoted bail 303 (FIG. 14). Therefore when slide 313 is moved to the left, bell crank 363 will be rocked clockwise thereby moving slide 364 forwardly with cam surface 364c raising the aforenoted bail 303. Bail 303 when raised will also raise hook arm 302 thereby adjusting it into operating relationship with lever 167. As previously described, the adjustment of hook arm 302 into operating relationship with lever 167 provides for taking a total from quotient register 9 when clutch 41 is reengaged to complete its cycle.

Slide 227 when moved to the left operates means to maintain shift clutch 53 engaged until carriage 27 is shifted to its left end position. This is necessary, as will appear, because ram 345 which initiates the first left shift cycle, as described, will during said first shift cycle be biased from shift clutch engaging position toward position to engage registration clutch 55. The operation to engage clutch 55 however as previously noted is held in abeyance until carriage 27 is shifted to left end position.

Slide 227 upon movement to the left operates bell crank 234, slide 236, finger 270, lever 272, lever 253, and cam slide 252 to engage nose 252n of said slide with a roller 54r of clutch lever 54 of shift clutch 53 thereby holding the lever in clutch engaging position. In this operation, lug 253a of lever 253 is moved from between scissors 273, 274 which will then be closed and rotated as a unit a step clockwise to position the upper arm of scissor 273 beneath stud 341c of slide 341. A link 271 is operable by clutch 53 to move finger 270 downwardly from engagement with lever 272 which will be spring restored. However, lever 253 and slide 252 will be held in operated position by engagement of lug 253a with the bottom edge of scissor 273 to maintain engagement of shift clutch 53.

*The subtract, add and shift control program shaft*

During the first cycle of the above-described left shift operation of clutch 53, the aforenoted program shaft 352 (FIGS. 30, 31) will be rotated a 60° clockwise step of movement. Means on this program shaft is operable to control the program of operations to register a quotient in register 9. Program shaft 352 is fulcrumed at its respective ends in the machine left side frame and an inner subframe. Means mounted on the program shaft and devices operable therewith will be described from right to left.

Means for controlling the sign of registration in dividend register 6 and quotient register 9 includes a cam wheel 365 fast on shaft 352 adjacent its right end and having a pair of opposed lobes and a pair of opposed low parts. A cam follower 366 normally engages a low part of the cam wheel and includes an arm which engages a roller at the end of a crank 367 which is fast adjacent the left end of shaft 121 on which cylindrical cams 120, 202 (FIGS. 8, 9, 11) are fast. It will be recalled that cam 120 controls adjustment of digital actuators 26 for additive registration in dividend register 6 or alternatively for subtractive registration by complemental addition, and that cam 202 controls adjustment of counting fingers 203, 204 for subtractive or alternatively additive registration in quotient register 9. Furthermore, it will be recalled that shaft 121 and cams 120, 202 are normally spring held clockwise wherein the parts are adjusted for additive registration in dividend register 6 and subtractive registration in quotient register 9. Therefore when follower 366 engages a low part of cam wheel 365, shaft 121 and cams 120, 202 will be in normal clockwise position.

Program shaft 352 (FIGS. 30, 31) is adapted to be rotated, as later described, three 60° steps of clockwise movemet in each of a series of control operations. A suitable locating device 368 adjacent the left end of shaft 352 is operable to yieldably hold the shaft in its adjusted positions. Each series of operations controls the subtract, add and shift sequence of operations in the program of quotient registration and shaft 352 is rotated one-half turn for each series of operations.

The first step of shaft 352 will engage a lobe of cam wheel 365 with follower 366 to rock said follower clockwise. This will rock crank 367, shaft 121 and cams 120, 202 counterclockwise. This adjustment provides for subtractive registration in dividend register 6 and additive count in quotient register 9.

The second step of shaft 352 will engage a low part of cam wheel 365 with follower 366 and the parts will therefore be restored to provide for additive registration in dividend register 6 and subtractive count in quotient register 9.

During the third step of shaft 352, follower 366 will dwell on the low part of cam wheel 365. However, with the parts in this position, registration clutch 55 (FIG. 18) will be disengaged and shift clutch 53 will be engaged as will appear. It will be noted that cam wheel 365 on shaft 352 and other cam means on the shaft, later described, are symmetrical, and therefore one-half turn of shaft 352 will bring the cam means into position to repeat their operations.

Means for controlling (previously described) ram 345 to effect alternate engagement and disengagement of shift and registration clutches 53, 55 includes previously noted cam wheel 358 fast on shaft 352 to the left of cam wheel 365. Cam wheel 358 includes a pair of opposed lobes, a pair of opposed intermediate portions and a pair of opposed low portions.

Cam follower 357 has been described in movement from an intermediate position to engagement with a low part of cam wheel 358. In this operation push-pull link 354 was moved forwardly thereby moving ram 345 forwardly to engage shift clutch 53. From an inspection of FIGS. 28, 31, it will be seen that if link 354 is moved rearwardly from intermediate position, cranks 353 and 346 (FIG. 18) will be rocked counterclockwise to move ram 345 rearwardly thereby engaging registration clutch 55 and disengaging shift clutch 53. However it has been noted that this operation initially will be held in abeyance by lug 341b of slide 341 engaging shoulder 345s of ram 345. In this instance spring 355 will be charged as link 354 moves rearwardly.

The first step of program shaft 352 will engage a lobe of cam wheel 358 with followed 357 thereby moving link 354 rearwardly to position to engage registration clutch 55 and disengage shift clutch 53. At this time the sign control means, as previously described, will be adjusted for subtractive registration in dividend register 6 and additive count in quotient register 9.

The second step of program shaft 352 will engage an intermediate part of cam wheel 358 with follower 357. This will permit link 354 to be moved forwardly but not sufficiently to disengage registration clutch 55 and engage shift clutch 53. This operation is provided in consideration of timing to provide for subsequent rapid disengagement of registration clutch 55 and engagement of shift clutch 53. At this time, as previously described, the sign control means will be adjusted for additive registration in dividend register 6 and subtractive count in quotient register 9.

The third step of program shaft 352 will engage a low part of cam wheel 358 with follower 357. This will permit link 354 to be moved further forwardly to disengage registration clutch 55 and engage shift clutch 53. At this time, as previously described, the adjustment of the sign control means will not be changed.

Means driven by shift clutch 53 and by registration clutch 55 are operable to step program shaft 352.

A cam wheel 370 fast on program shaft 352 to the left of cam wheel 358 is operable by means driven by registration clutch 55. This means, however, is not operated until program shaft 352 is given its first step of movement by means of shift clutch 53 which means therefore will be described first.

The means driven by shift clutch 53 comprises the previously noted cam wheel 351 fast on shaft 352 to the left of cam wheel 370. Cam wheel 351 has a pair of opposed lobes and is adapted to be driven by a tooth 348t of a cam disc 348 which, as previously described, is splined for axial adjustment on shaft 349 which is driven by the driven member of shift clutch 53. Cam disc 348 has been described as adjusted, from an idly operable position, by lever 347 toward the right to a position wherein tooth 348t is in the plane of cam wheel 352.

Near the end of a cycle of shift clutch 53, tooth 348t will engage a lobe of cam wheel 351 and rotate program shaft 352 its first step of movement. Cam wheel 351 then will be out of the path of tooth 348t but will be rotated to position to be engaged again by tooth 348t after shaft 352 is given its third step of movement.

Means operable by registration clutch 55 (FIG. 18) subsequent to an overdraft of dividend register 6 is operable to give program shaft 352 in its second step of movement. This means comprises, previously noted, cam wheel 370 on shaft 352 (FIGS. 28–31). Cam wheel 370 includes a pair of opposed lobes and is adapted to be engaged by a tooth 371t of a disc 371 which is splined for axial adjustment on a shaft 285 driven at a one-to-one ratio with the output shaft of registration clutch 55.

Disc 371 is urged to the right on shaft 285 by a spring 369 but is normally held to the left with tooth 371t out of the plane of the lobes of cam wheel 370 by an upstanding finger 372f of a rocker 372. Rocker 372 is mounted on a longitudinal short shaft which is supported in a fixed bracket 315 a short distance to the left of the highest order wheel 25 of dividend register 6.

Rocker 372 is provided with a rightwardly extending nose 372n which overlies the rear end of a longitudinal arm 373 which is pivotally mounted at its front to the rear end of a lower arm of a bell crank 374. Bell crank 374 remains stationary in the normal operation of the machine and is operated only in connection with a stopping operation, if for example, the division mechanism is operated, as later described, without a divisor entered in the machine.

Arm 373 is located immediately to the left of the highest order wheel 25 of dividend register 6, and a pin 373p intermediate the ends of the arm rests upon the periphery of said wheel. With the parts in the above normal position, the rear end of arm 373 will be raised and, by engagement with nose 372, will hold rocker 372 counterclockwise (FIG. 29) and finger 372f toward the left as viewed from the front of the machine. Accordingly, finger 372f will normally hold disc 371 to the left with tooth 371t out of the plane of the lobes of cam wheel 370.

In subtraction by complemental additive registration, the highest order wheel 25 of register 6 is moved to "9" registering position during digital registration. If there is no overdraft during the current cycle, the wheel will be moved to "0" registering position by a tens transfer operation before the end of the cycle. If, however, there is an overdraft, there will be no tens transfer and the wheel will remain at "9" registering position. When this occurs, a recess 25r in the periphery of the wheel will be moved into and remain in registration with pin 373p to permit the rear end of arm 373 to be lowered from nose 372n. This will release rocker 372 for clockwise movement and therefore spring 369 will be effective to move disc 371 toward the right and tooth 371t into the plane of the lobes of cam wheel 370.

The previously described first 60° step of movement of program shaft 352 rotates cam wheel 370 to a position wherein a lobe thereof is in the rotary path of tooth 371t of disc 371 when said disc is adjusted to the right to locate the tooth in the plane of the lobes. During the terminal part of an overdraft cycle and the idle phase at the beginning of the following cycle, tooth 371t will engage a lobe of cam wheel 370 and rotate program shaft 352 the second 60° step. As previously described in the second step of the program shaft, registration clutch 55 will remain engaged but the sign of registration in dividend register 6 and quotient register 9 will be reversed, and therefore the overdraft will be corrected during said following cycle. Also rocker 372 will restore disc 371 to the left when the highest order wheel 25 is moved from "9" registering position.

It will be noted that each lobe of cam wheel 370 includes a cam wing 370c extending clockwise toward the right. Wings 370c are not operable in a normal division program, and the purpose and operation will be described later.

Program shaft 352 will be given the third 60° step near the end of the above-described corrective registering cycle during which time tens transfer registration occurs. The means for giving program shaft 352 the third step includes a cam wheel 375 fast on said shaft to the left of cam wheel 351 and having a pair of opposed lobes. A disc 376 fast on shaft 285 includes a tooth 376t rotating in the plane of the lobes of cam wheel 375 and which lobes are normally out of the path of said tooth. The two previously described 60° steps of shaft 352 will bring a lobe of cam wheel 375 into the rotary path of tooth 376t which will engage said lobe during the tens transfer phase of the corrective registering cycle and give said shaft the third 60° step. As a result, shift clutch 53 will be engaged, as described, and registration clutch 55 will be disengaged at the end of the cycle. Furthermore, program shaft 352 will be in position to begin another series of operations during the ensuing cycle of shift clutch 53.

A cam wheel 377 is fast on shaft 352 to the left of cam wheel 375 and has a pair of opposed lobes. When shaft 352 is in normal position a lobe of cam wheel 377 engages the rear end of a spring urged follower comprising a lever 378 which terminates at its front in a hook end 378h.

The first step of shaft 352 will move the lobe of cam wheel 377 from engagement with follower 378 which will then be rocked counterclockwise to lower hook 378h in front of an ear 266e (FIGS. 24, 28) of rearwardly adjusted slide 266. This will maintain slide 266 in rearward position, for a purpose later described, after the slide is released by pin 347p of lever 347. When program shaft 352 completes each three step series, a lobe of cam wheel 377 will engage and restore follower 378.

Quotient registration

Setting and conditioning operations performed during a divisor entering cycle of main clutch 41 and during the subsequent 30° step of the clutch in a quotient printing cycle have been described. Also operation of program shaft 352 in registration sign control and control of operation of shift and registration clutches 53, 55 upon operation of said clutches has been described. Furthermore, in the above operation, initial engagement of shift clutch 53 by ram 345 for left shift operation in response to counterclockwise setting of lever 347 has been described to initiate the program of operations.

During the first cycle of shift clutch 53, carriage 27 will be shifted from its normal right end position. This will release slide 263 (FIGS. 18, 19, 21–23) which will be spring moved to the left thereby moving lug 263e to a position in front of tail 347t of lever 347. Lever 347 therefore will be locked in counterclockwise operated position when operating crank 344 is restored as later described.

Leftward movement of slide 263 will release shift direction control shuttle 260 which normally is held in left shift controlling position against the tension of spring 260s by the slide. However, the shuttle will be maintained in left shift controlling position by lug 341a of raised slide 341 engaging finger 260a.

Furthermore, during the first shift cycle of clutch 53, program shaft 352 (FIGS. 30, 31) will be given its first step of movement. Ram 345 (FIG. 18) therefore will be powered to the rear toward position to engage registration clutch 55, and digital actuators 26 (FIGS. 8, 9) will be set for subtractive registration in dividend register 6 whereas counting finger 204 (FIG. 15) will be enabled for additive registration in quotient register 9. Ram 345 however will be arrested in intermediate position by shoulder 345s engaging lug 341b of raised slide 341 and thus spring 355 will be charged. This operation of ram 345 would cause disengagement of shift clutch 53 but for the holding operation of nose 252n of slide 252 which is operated during the 30° step of the quotient printing cycle and then held operated by scissors 273, 274.

Shift clutch 53 will remain engaged until carriage 27 is shifted into its left end position. Upon movement of carriage 27 into left end position, plate 27e (FIGS. 9, 19, 20) of the carriage will engage yoke 360 and move it toward the left against the tension of spring 359. Accordingly, cam plate 360a of yoke 360 will engage cam disc 361 to restore the yoke, shaft 338 and crank 337 clockwise. As a result, crank 337 will restore crank 336, shaft 335, and crank 344 counterclockwise from engagement with pin 347p of lever 347. However, as noted before, lever 347 will not be restored but will be restrained in counterclockwise operated position by lug 263e of slide 263.

Shaft 338 when restored clockwise also will restore cam crank 339 (FIG. 18) which is fast adjacent its right end. Accordingly, lever 340 will be restored clockwise thereby restoring slide 341 downwardly. Slide 341, when restored downwardly, restores cam slide 252 so that clutch lever 54 of shift clutch 53 is released from nose 252n and during quotient registration is controlled by nose 345n of ram 345. This restoring operation is performed by stud 341c which, when slide 341 is lowered, engages and then releases cam end 273c of scissor 273. When stud 341c engages cam end 273c, scissors 273, 274 are rotated counterclockwise as a unit until shoulder 274s of scissor 274 engages lug 253a of lever 253 thereby restraining the scissor from further counterclockwise movement. Scissor 273, however, will continue to move counterclockwise thereby opening the scissors and permitting lever 253 to be restored counterclockwise to remove nose 252n from engagement with roller 54n of clutch lever 54. Clutch 53 will therefore be disengaged at the end of the cycle which moves carriage 27 into left end position.

Quotient registration is initiated when lug 341b of slide 341 is removed from restraining engagement with shoulder 345s of ram 345 when the slide is restored downwardly. This will release ram 345 which will be moved rearwardly by spring 355 (FIGS. 28, 31) to engage registration clutch 55. Furthermore, lug 341a will be moved from restraining engagement with finger 260a of shuttle 260, and the shuttle therefore will be rocked by spring 260s (FIG. 23) to right shift controlling position.

Subtractive registration will continue until an overdraft occurs. During the terminal part of the overdraft cycle and the idle phase of the first part of the next cycle, program shaft 352 (FIGS. 30, 31) will be given its second step thereby setting the controls as described to reverse the sign of registration in the dividend and quotient registers to correct the overdraft during said next cycle. During the tens transfer phase of the corrective cycle, the program shaft will be given its third step to effect engagement of shift clutch 53 and disengagement of registration clutch 55 at the end of the corrective cycle. During the last part of the shift cycle, the program shaft will be given a step of movement to effect engagement of registration clutch 55, to change the sign of registration and to disengage clutch 53 at the end of a single shift cycle. This accordingly begins another sequence of subtract, add and shift operations which sequence of operations will continue until carriage 27 is shifted into normal right end position.

When carriage 27 is shifted to right end position, slide 263 will be restored to the right thereby removing lug 263c (FIGS. 19, 28) from engagement with tail 347t of lever 347 which will therefore by spring restored clockwise. Disc 348 therefore will be released and restored by spring 350 to the left. Furthermore, ear 263a of the slide will reengage finger 260b of shuttle 260 to restore the shuttle to left shift controlling position.

When lever 347 is restored clockwise, pin 347p will be removed from restraining engagement with slide 266 which, if moved forwardly, would reengage main clutch 41 (FIG. 3) for the quotient printing cycle. Means, however, comprising follower 378 (FIGS. 28, 31) is provided to prevent this operation from occurring until a quotient digit is registered with carriage 27 in right end position.

It will be recalled that when program shaft 352 is given its first step in each sequence of operations, a hook end 378h is moved to a position in front of an ear 266e of slide 266. Therefore, when carriage 27 is shifted to right end position, slide 266 will be restrained in rear position by hook end 378h. The program will continue until the end of the corrective registering cycle of clutch 55. Near the end of this cycle, ram 345 will be powered forwardly by spring 356, as described, toward position to engage shift clutch 53 but will be arrested in intermediate position by lug 353a (FIGS. 28, 31) of crank 353 engaging stop lug 347s of lever 347. Therefore, both shift clutch 53 and registration clutch 55 will be disengaged and quotient registration will be terminated.

*Quotient and remainder printing*

When program shaft 352 (FIGS. 30, 31) is given its third step near the end of the corrective registering cycle, cam wheel 377 will restore follower 378 clockwise thereby removing hook end 378h from in front of ear 266e (FIGS. 24, 28) of slide 266 which will be moved forwardly to reengage main clutch 41. A total therefore will be taken from wheels 30 and a quotient will be printed.

Near the end of the quotient printing cycle of clutch 41, program shaft 310 will be given another 60° step. In this step of shaft 310, cams 323 and 327 will permit slides 227 and 313 to be restored. Slide 233, however, will remain set so that clutch 41 will continue into a remainder printing cycle.

During the first part of the remainder printing cycle of clutch 41, program shaft 310 (FIG. 26) will be given another 60° step. In this step of the program shaft, cam 324 will permit slide 233 to be restored. Clutch lever 43 will therefore disengage clutch 41 at the end of the cycle. In this step of the program shaft, cam 328 will move and hold slide 314 to the left. This slide controls means to disable hold-up clutch lever 175. As a result, clutch 41 will complete the cycle without interruption. In this step of the program shaft, cam 322 will move and hold slide 226 to the left. Accordingly, in the operation of clutch 41, a total will be taken from dividend register 6 and a remainder, if any, will be printed.

Near the end of the cycle, program shaft 310 will be given its final 60° step. In this operation, slides 226, 314 will be restored. Also when clutch 41 is disengaged at the end of the remainder printing cycle, key 17 will be released.

The operator may inadvertently depress key 17 and initiate a program of division without having entered a divisor in the machine. In such instance, an overdraft would not occur and the machine would "run wild," i.e., digital actuators 26 would continue to run subtractively until the machine is disconnected from the power source. Means therefore is provided to supersede the normally operable division control means to continue the program of subtract, add and shift operations until the program is terminated upon movement of actuator carriage 27 into normal right end position.

The superseding means includes a cam wheel 380 (FIGS. 25, 28, 31) which is normally spring held clockwise with a shoulder 380s engaging a roller 374r at the end of an upstanding arm of previously noted bell crank 374 which is spring biased counterclockwise. In the normal operation of the division means, roller 374r will remain engaged with a high part of cam wheel 380 and therefore crank 374 will remain stationary as previously described.

Cam wheel 380 is fixed for rotation with a ratchet wheel 381 which is controlled by a feed pawl 382 and a holding pawl 383. Holding pawl 383 is integral with the front arm of the cam follower comprising previously described lever 378. Feed pawl 382 is slidably supported at its front end by holding pawl 383 and extends to the rear where it is eccentrically mounted on shaft 285 which, as previously described, is driven by registration clutch 55.

During the first step of program shaft 352 upon operation of shift clutch 53, as described, follower 378 will be rocked counterclockwise thereby lowering pawls 382, 383 into engagement with ratchet wheel 381. Therefore during each cycle of clutch 55 in the registration of a quotient digit, pawl 382 will be reciprocated to step ratchet wheel 381 and cam wheel 380 one step counterclockwise.

In the normal operation of the machine, an overdraft will occur with a maximum of ten subtractions of the divisor from the dividend in registration of a quotient digit. During the additive corrective cycle, program shaft 352 will be given its third and final step in a sequence of operations thereby restoring follower 378 and pawls 382, 383. Cam wheel 380 and ratchet wheel 381 therefore will be released and restored clockwise.

During the above-described normal operation of the division control means, roller 374r will ride the high part of cam wheel 380 and bell crank 374 will remain stationary as noted. However, if an overdraft does not occur during the tenth cycle, the eleventh subtractive cycle will be effective to rotate the high part of cam wheel 380 from engagement with roller 374r, and therefore crank 374 will be rocked counterclockwise to engage roller 374r with a low part of the cam wheel.

When crank 374 (FIGS. 28, 29) is rocked counterclockwise, the front end of arm 373 will be raised with pin 373p acting as a fulcrum by engagement with the rim of highest order register wheel 25. As a result, the rear end of arm 373 will be lowered from nose 372n of rocker 372 which will be rocked, in the same manner as described in an overdraft, to release disc 371 for adjustment to enable tooth 371t. Accordingly, program shaft 352 (FIGS. 30, 31) will be operated to continue the sequence of operations.

Latch means is provided to prevent cam wheel 380 and ratchet wheel 381 from being restored when pawls 382, 383 are restored at the end of each sequence of operations of cam shaft 352. Therefore, disc 371 will not be restored, and the continuing sequence of subtract, add, shift operations will include each only a single subtract cycle.

The latch means includes a lever 384 (FIG. 25) spring urged clockwise against a limit stop and having a horizontal arm terminating in a hook end 384h. When cam wheel 380 is stepped to its eleventh position, a boss 380a on the cam wheel will engage and pass beneath hook end 384h which will be raised and then will drop to the rear of boss 380a. Cam wheel 380 and ratchet wheel 381 will therefore be restrained from clockwise return movement.

Because disc 371 is not restored as in the normal operation of the program means, tooth 371t will be in the path of a lobe of cam wheel 370 (FIGS. 30, 31) when program shaft 352 is stepped during operation of shift clutch 53. In this operation, a cam wing 370c will pass in front and engage tooth 371t to cam disc 371 rearwardly Then when the lobe of cam wheel 370 passes beyond tooth 371t, spring 369 (FIG. 29) will again move disc 371 forwardly to locate the tooth in the plane of the cam lobes.

Means is operable to release latch lever 384 in the quotient printing operation of main clutch 41. The releasing means includes a cam 385 on shaft 42 driven by main clutch 41. A cam follower comprising a lever 386 is spring urged clockwise into engagement with cam 385. A link 387 extends rearwardly from lever 386 and has pivotal connection with one end of a lever 388. During operation of clutch 41, cam 385 will rock lever 386 counterclockwise to move link 387 forwardly and rock lever 388 clockwise. Clockwise movement of lever 388 will engage an arm thereof with a depending arm of latch lever 384 thereby rocking said lever counterclockwise to lift hook end 384h from engagement with boss 380a thereby releasing cam wheel 380 and ratchet wheel 381.

I claim:
1. In a calculating machine having a register:
cyclic rotary digital actuators for said register rotatable a full turn in each cycle; idly operable during a part of each cycle, and adjustable for additive or for subtractive registering operation; and
division control means including:
   means for detecting an overdraft in said register during subtractive registration by said actuators;
   normally disabled means operable during idle operation of said actuators to adjust said actuators for additive operation; and
   means controlled by said overdraft detecting means for enabling said normally disabled means.
2. In a calculating machine having a register:
cyclic unidirectional rotary digital actuators for said register rotatable a full turn in each cycle idly operable during part of each cycle, and, operable to perform addition of a value entered therein, or to perform subtraction by addition of the complement of said value; and
division control means including:
   means for detecting an overdraft in said register during subtractive operation of said actuators, and
   means controlled by said overdraft detecting means to change the operation of said actuators during idle operation thereof for addition of the entered value.
3. The invention according to claim 2:
said actuators being axially adjustable to one position with respect to said register to add the value entered in said actuators, and to another position to subtract said value by adding the complement thereof; and
said means controlled by said overdraft detecting means being operable to adjust said actuators to said one position.
4. The invention according to claim 3:
each actuator including a series of teeth axially settable with respect to said actuator;
including setting means operable to set the teeth of said actuators axially to represent an entered value, the unset teeth representing the complement of said value; and
said actuators being adjustable axially to said one position to bring the set teeth into operating position with respect to said register and to said other position to bring the unset teeth into operating position.
5. The invention according to claim 3:
said actuators being idly operable during a part of each cycle; and
said means controlled by said overdraft detecting means being operable to adjust said actuators axially to said one position during idle operation of said actuators.
6. In a calculating machine having a register:
cyclic unidirectional rotary digital actuators for said register rotatable a full turn in each cycle, axially adjustable to one position with respect to said register to add the value entered in said actuators, and to another position to subtract said value by adding the complement thereof;
said actuators being idly operable during a part of each cycle;
drive means for said actuators; and
division control means including:
   normally disabled means operable in time with said actuators for adjusting said actuators to said one position during idle operation thereof; and
   means operable to detect an overdraft in said register during subtractive operation of said actuators and thereupon to enable said actuator adjusting means.
7. The invention according to claim 6:
wherein said normally disabled adjustment means includes a member rotatably driven in an idly operable position by said actuator drive means and adjustable to an effective position when an overdraft occurs in said register.
8. In a calculating machine having a register:
ordinally shiftable cyclic unidirectional rotary digital actuators for said register rotatable a full turn in each cycle, said actuators being axially adjustable with respect to each ordinal position to a first position wherein said actuators are operable to add a value entered therein or to a second position wherein said actuators are operable to subtract the entered value by complemental addition;
sign control means alternately operable to adjust said actuators to said first and second positions;
drive means for said actuators;
shifting means for said actuators; and
division control means including:
   means for detecting an overdraft in said register during subtractive operation of said actuators;
   means controlled by operation of said overdraft detecting means to operate said sign control means to institute a corrective cycle of said actuators;
   means operable to disengage said drive means at the end of said corrective cycle of said actuators and to initiate operation of said shifting means; and
   means operable to terminate operation of said shifting means after one ordinal shift of said actuators, to engage said drive means, and to operate said sign control means.
9. In a calculating machine having a register:
ordinally shiftable cyclic rotary digital actuators for said register rotatable a full turn in each cycle, and adjustable for additive or for subtractive registering operation;
means for shifting said actuators, said shifting means being adjustable for right or left shift operation;
cyclic drive means for said actuators;
cyclic drive means for said shifting means; and
division control means including:
   means for engaging said shift drive means and adjusting said shifting means for left shift operation;
   means operable by said shift drive means to adjust said actuators for subtractive operation; and
   means operable upon movement of said actuators into left end position to terminate operation of said shifting means and to engage said actuator drive means.
10. The invention according to claim 9:
said means for engaging said actuator drive means being adapted to be conditioned;
including means operable by said shift drive means to condition said means for engaging said actuator drive means;
including means operable to hold the operation of said conditioned means in abeyance; and
including means operable upon movement of said actuators into left end position to disable said holding means.
11. The invention according to claim 9:
wherein said means for engaging said actuator drive means includes spring operated means;
including means operable by said shift drive means to charge said spring operated means;
including interponent means operable to restrain said spring operated means; and
including means operable to release said spring oper- ated means upon movement of said actuators into left end position.

12. The invention according to claim 9:
including shift direction control means operable by said shift drive means and adjustable to positions respectively operable to adjust said actuator shifting means for right and left shift operation;
including means operable upon movement of said actuators into right end position to adjust said shift direction control means to left shift adjusting position; and
including means operable upon movement of said actuators into left end position to adjust said shift direction control means to right shift adjusting position.

13. The invention according to claim 12:
including spring means for biasing said shift direction control means to one of its positions;
wherein movement of said actuators into one end position adjusts said shift direction control means to its other position against the tension of said spring means;
wherein said division control means includes means for latching said shift direction control means in said other position when said actuators are shifted from said one end position; and
including means for releasing said latching means upon movement of said actuators into the other end position.

14. In a calculating machine having a register:
cyclic rotary digital actuators for said register rotatable a full turn in each cycle, idly operable during a part of each cycle, and adjustable for additive or for subtractive registering operation; and
division control means including:
means for detecting an overdraft in said register during subtractive registration by said actuators in a particular order;
normally disabled means operable during idle operation of said actuators to adjust said actuators for additive operation in the same order; and
means controlled by said overdraft detecting means for enabling said normally disabled means.

15. In a calculating machine having a register:
cyclic unidirectional rotary digital actuators for said register rotatable a full turn in each cycle idly operable during part of each cycle, and, operable to perform addition of a value entered therein, or to perform subtraction by addition of the complement of said value; and
division control means including:
means for detecting an overdraft in said register during subtractive operation of said actuators in a particular order; and
means controlled by said overdraft detecting means to change the operation of said actuators during idle operation thereof for addition of the entered value in the same order.

References Cited

UNITED STATES PATENTS

| | | | |
|---|---|---|---|
| 2,229,889 | 1/1941 | Friden | 235—62 |
| 2,872,115 | 2/1959 | Ellerberg | 235—63 |
| 2,970,755 | 2/1961 | Gang | 235—60.2 |
| 3,044,697 | 6/1962 | Gang | 235—63 |
| 3,104,812 | 9/1963 | Lagomarsino | 235—63 |

FOREIGN PATENTS

| | | |
|---|---|---|
| 724,043 | 2/1955 | Great Britain. |
| 789,854 | 1/1963 | Great Britain. |

STEPHEN J. THOMSKY, *Primary Examiner.*